United States Patent

Ishizuka

(10) Patent No.: US 10,604,664 B2
(45) Date of Patent: *Mar. 31, 2020

(54) INFRARED ABSORBING PARTICLE DISPERSION, AQUEOUS INK, AND INK CARTRIDGE

(71) Applicant: FUJI XEROX CO., LTD., Tokyo (JP)

(72) Inventor: Takahiro Ishizuka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 386 days.

This patent is subject to a terminal disclaimer.

(21) Appl. No.: 15/590,260

(22) Filed: May 9, 2017

(65) Prior Publication Data

US 2018/0057700 A1 Mar. 1, 2018

(30) Foreign Application Priority Data

Aug. 26, 2016 (JP) .................................. 2016-166227

(51) Int. Cl.
*C09D 11/03* (2014.01)
*C09D 11/102* (2014.01)
(Continued)

(52) U.S. Cl.
CPC ................. *C09D 11/03* (2013.01); *B41J 2/01* (2013.01); *C09D 11/102* (2013.01); *C09D 11/32* (2013.01); *C09D 11/322* (2013.01); *C09D 11/38* (2013.01)

(58) Field of Classification Search
None
See application file for complete search history.

(56) References Cited

U.S. PATENT DOCUMENTS 5,019,549 A * 5/1991 Kellogg ................. B41M 5/465
428/913
5,256,620 A 10/1993 Burberry et al.
(Continued)

FOREIGN PATENT DOCUMENTS

| JP | 6-210972 A | 8/1994 |
| JP | 11-021460 A | 1/1999 |
| JP | 2003-231819 A | 8/2003 |

*Primary Examiner* — Helene Klemanski
(74) *Attorney, Agent, or Firm* — Sughrue Mion, PLLC

(57) ABSTRACT

An infrared absorbing particle dispersion includes an aqueous medium; and infrared absorbing particles that are dispersed in the aqueous medium and contain a compound represented by formula (1) below and at least one polymer selected from the group consisting of polyurethane, polyester, polyamide, polyurea, and polycarbonate, each having an acid value of from 5 mg KOH/g to 50 mg KOH/g:

FORMULA (1)

FORMULA (1-R)

wherein, in formula (1), $R^a$ represents a group represented by formula (1-R) and $R^b$, $R^c$, and $R^d$ each independently (Continued)

represent an alkyl group, and, in formula (1-R), $R^e$ represents a hydrogen atom or a methyl group and n represents an integer of from 0 to 3.

20 Claims, 1 Drawing Sheet

(51) Int. Cl.
*C09D 11/32* (2014.01)
*C09D 11/322* (2014.01)
*C09D 11/38* (2014.01)
*B41J 2/01* (2006.01)

(56) References Cited

U.S. PATENT DOCUMENTS

| | | | |
|---|---|---|---|
| 8,652,718 B2* | 2/2014 | Tian | G03G 9/0821 |
| | | | 430/105 |
| 9,550,902 B1* | 1/2017 | Sakamoto | C09D 11/38 |
| 9,760,034 B2* | 9/2017 | Tian | G03G 9/09775 |
| 10,087,271 B2* | 10/2018 | Ishizuka | C08F 220/14 |
| 10,266,713 B2* | 4/2019 | Nakaso | C09D 11/326 |
| 2003/0138723 A1 | 7/2003 | Purbrick et al. | |
| 2018/0086930 A1* | 3/2018 | Yamashita | C09D 11/326 |
| 2018/0112092 A1* | 4/2018 | Fujita | C09B 23/0066 |
| 2018/0273785 A1* | 9/2018 | Nakaso | C09D 11/326 |

* cited by examiner

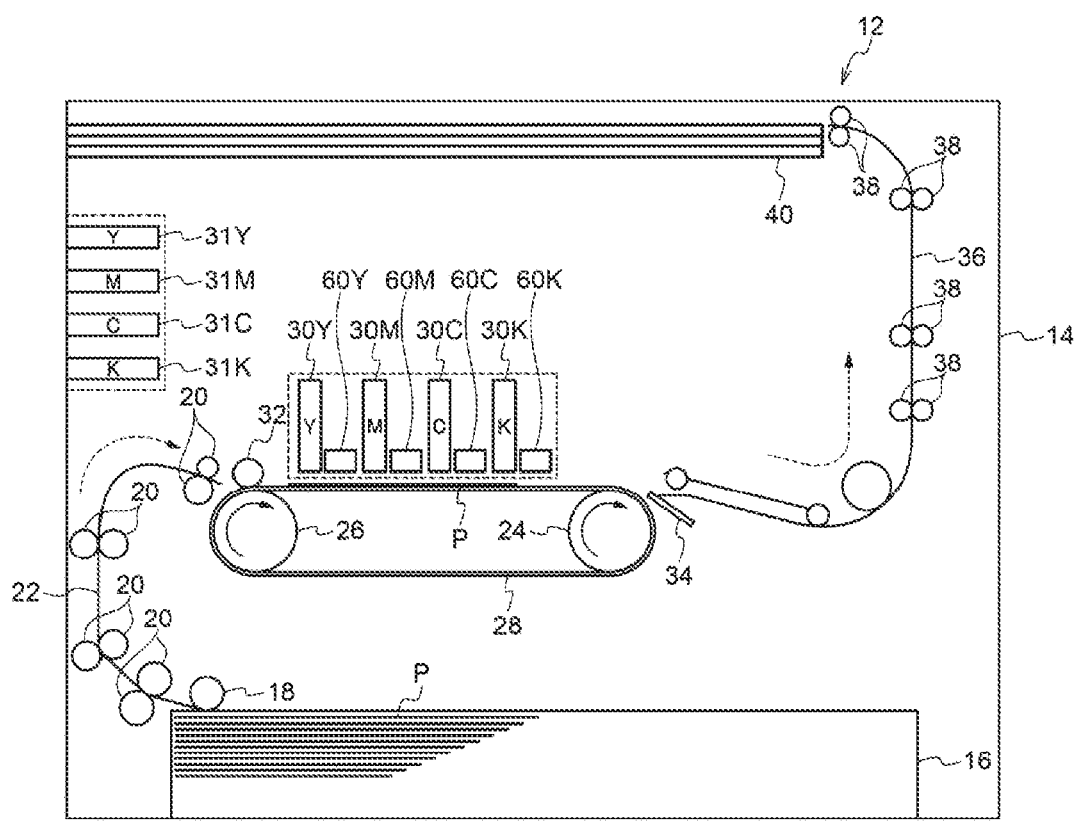

INFRARED ABSORBING PARTICLE DISPERSION, AQUEOUS INK, AND INK CARTRIDGE

CROSS-REFERENCE TO RELATED APPLICATIONS

This application is based on and claims priority under 35 USC 119 from Japanese Patent Application No. 2016-166227 filed Aug. 26, 2016.

BACKGROUND

1. Technical Field

The present invention relates to an infrared absorbing particle dispersion, an aqueous ink, and an ink cartridge.

2. Related Art

Compositions containing an infrared absorbing agent are known as inks, toners, and the like which are fixed to a recording medium by light irradiation.

SUMMARY

According to an aspect of the invention, there is provided an infrared absorbing particle dispersion including:
an aqueous medium; and
infrared absorbing particles that are dispersed in the aqueous medium and contain a compound represented by formula (1) below and at least one polymer selected from the group consisting of polyurethane, polyester, polyamide, polyurea, and polycarbonate, each having an acid value of from 15 mg KOH/g to 50 mg KOH/g:

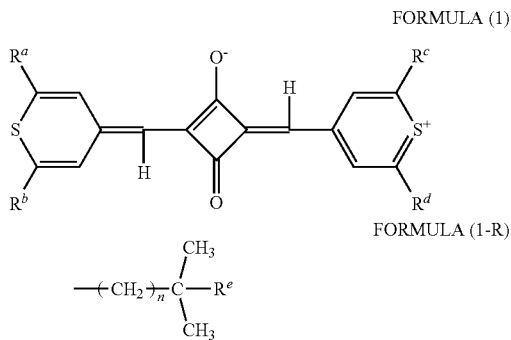

FORMULA (1)

FORMULA (1-R)

wherein, in formula (1), $R^a$ represents a group represented by formula (1-R) and $R^b$, $R^c$, and $R^d$ each independently represent an alkyl group, and, in formula (1-R). $R^e$ represents a hydrogen atom or a methyl group and n represents an integer of from 0 to 3.

BRIEF DESCRIPTION OF THE DRAWING

Exemplary embodiments of the present invention will be described in detail based on the following FIGURE, wherein:

The FIGURE is a schematic configuration diagram which shows an example of an image forming apparatus according to the exemplary embodiment.

DETAILED DESCRIPTION

Description will be given below of embodiments of the invention. These descriptions and examples are illustrative of embodiments and do not limit the scope of the invention.

In the present disclosure, is a case of referring to the amount of an individual component in the composition and where there are plural substances corresponding to the individual component in the composition, the amount means the total amount of the plural substances present in the composition unless otherwise specified.

In the present disclosure, "alkane", "alkyl", "alkylene", "alkene", and "alkenyl" include not only chain hydrocarbons but also cyclic hydrocarbons.

In the present disclosure, the term "aqueous medium" means water or a mixed solvent of water and other solvents, which means a mixed solvent containing water as a main solvent. In the present disclosure, the term "main solvent" refers to the solvent having the highest weight among all the solvents forming the mixed solvent.

<Infrared Absorbing Particle Dispersion>

The infrared absorbing particle dispersion according to the exemplary embodiment is a dispersion which includes an aqueous medium, and infrared absorbing particles dispersed in the aqueous medium, in which the infrared absorbing particles contain a compound represented by formula (1) below and at least one of polymers selected from the group consisting of a polyurethane, a polyester, a polyamide, a polyurea, and a polycarbonate, each having an acid value of from 5 mg KOH/g to 50 mg KOH/g.

In the related art, in order to contain an organic compound having an insoluble or hardly soluble property in water in an aqueous medium, a technique is known of forming particles containing both the organic compound and the polymer and dispersing the particles in an aqueous medium.

In the exemplary embodiment, there is provided a dispersion of infrared absorbing particles which contains the compound represented by formula (1) and a polymer in which particles are formed to contain both the compound represented by formula (1) and at least one of polymers selected from the group formed of polyurethane, polyester, polyamide, polyurea, and polycarbonate with an acid value of from 5 mg KOH/g to 50 mg KOH/g, and the compound represented by formula (1) is stably dispersed in an aqueous medium.

In the exemplary embodiment, the acid value of at least one of polymers selected from polyurethane, polyester, polyamide, polyurea, and polycarbonate is from 5 mg KOH/g to 50 mg KOH/g. When the acid value of the polymer is less than 5 mg KOH/g, the dispersibility of the polymer in the aqueous medium is relatively low, such that the infrared absorbing particles exhibit relatively inferior dispersion stability. On the other hand, when the acid value of the polymer exceeds 50 mg KOH/g, the water solubility of the polymer is relatively high, thus particles containing the polymer and the compound represented by formula (1) are not easily formed, and accordingly, it is difficult to obtain infrared absorbing particles stably dispersed in an aqueous medium. From these viewpoints, the lower limit of the acid value of the at least one of polymers selected from polyurethane, polyester, polyamide, polyurea, and polycarbonate is 5 mg KOH/g or more, more preferably 8 mg KOH/g or more, and even more preferably 10 mg KOH/g or more, while the upper limit is 50 mg KOH/g or less, more preferably 40 mg KOH/g or less, and even more preferably 30 mg KOH/g or less.

In the exemplary embodiment, the dispersion stability of the infrared absorbing particles is excellent. Therefore, according to the exemplary embodiment, aggregates are not easily formed in the process of preparing the dispersion of infrared absorbing particles, and the yield of infrared absorbing particles is high. In addition, according to the exemplary embodiment, a dispersion is obtained in which infrared absorbing particles having a small particle size (for example, volume average particle diameter of 150 nm or less) are dispersed.

In the exemplary embodiment, the dispersion state of the infrared absorbing particles may be an emulsion in which liquid particles are dispersed, or may be a suspension in which solid particles are dispersed, and from the viewpoint of dispersion stability, a suspension in which solid particles are dispersed is preferable.

That is, the infrared absorbing particle dispersion according to the exemplary embodiment may be an emulsion in which the infrared absorbing particles are dispersed in an aqueous medium in a liquid state, or may be a suspension in which the infrared absorbing particles are dispersed in an aqueous medium in a solid state, and from the viewpoint of the dispersion stability of the infrared absorbing particles, a suspension is preferable.

Detailed description will be given below of the components, composition, product on method, and the like of the infrared absorbing particle dispersion according to the exemplary embodiment. In the description below, the at least one of polymers selected from the group formed of polyurethane, polyester, polyamide, polyurea, and polycarbonate with an acid value of from 5 mg KOH/g to 50 mg KOH/g s referred to as the "specific polymer".

[Compound Represented by Formula (1)]

The compound represented by formula (1) is not easily deteriorated in terms of the infrared absorbing performance even when stored for a long period of time or at a high temperature. As the mechanism for this, the following is assumed.

A compound having a squarylium structure is contained in an aqueous composition such as a light fixing ink for reasons such as high infrared absorbing performance or the like; however, the squarylium structure may be permeated by a solvent and other materials (dispersing agent, surfactant, and the like) and decomposed thereby.

In contrast, in the compound represented by formula (1), since at least one of the four alkyl groups is a branched alkyl group having 3 or more carbon atoms, it is considered that molecules which permeate the squarylium structure are less likely to approach the squarylium structure. Therefore, it is presumed that the compound represented by formula (1) is not easily decomposed in the aqueous composition, and the infrared absorbing ability does not easily deteriorate even after storage for a long period of time or at a high temperature.

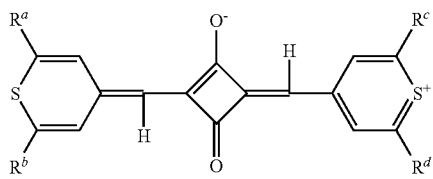

FORMULA (1)

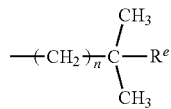

FORMULA (1-R)

In formula (1), $R^a$ represents a group represented by formula (1-R).

The total number of carbon atoms of the group represented by formula (1-R) is preferably 6 or less, more preferably 5 or less, even more preferably 4 or less, and particularly preferably 4. The lower limit of the total number of carbon atoms is 3.

In formula (1-R), $R^e$ represents a hydrogen atom or a methyl group. $R^e$ is preferably a methyl group. In a case where $R^e$ is a methyl group, the group represented by formula (1-R) has a structure in which the terminal is branched into three and the reduction of the infrared absorbing performance is prevented in comparison with a case where $R^e$ is a hydrogen atom. It is considered that this is because, in comparison with the structure in which $R^e$ is a hydrogen atom, for the structure in which $R^e$ is a methyl group, the molecules which permeate the squarylium structure are less likely to approach the squarylium structure and the decomposition of the compound represented by formula (1) is prevented.

In formula (1-R) n represents an integer of from 0 to 3. n is preferably an integer of from 0 to 2, more preferably 0 or 1, and even more preferably 0. The smaller n is, the more the reduction of the infrared absorbing ability is prevented. It is considered that this is because, the smaller the value of n, the closer the distance between the branched structure moiety and the squarylium structure in the group represented by formula (1-R) is, thus the molecules which permeate the squarylium structure are less likely to approach the squarylium structure and the decomposition of the compound represented by formula (1) is prevented.

Specific examples of the group represented by formula (1-R) include an isopropyl group, an isobutyl group, a tert-butyl group, a 3-methylbutyl group (3-methylbutan-1-yl group), a 2,2-dimethylpropyl group (2,2-dimethylpropan-1-yl group), 4-methylpentyl group (4-methylpentan-1-yl group), 3,3-dimethylbutyl group (3,3-dimethylbutan-1-yl group), and 4,4-dimethylpentyl group (4,4-dimethylpentan-1-yl group). Among the above, an isopropyl group, an isobutyl group, and a tert-butyl group are more preferable, and a tert-butyl group is even more preferable.

In formula (1), $R^b$, $R^c$, and $R^d$ each independently represent an alkyl group. At least one of $R^b$, $R^c$, and $R^d$ is preferably a group represented by formula (1-R), and all of $R^b$, $R^c$ and $R^d$ are more preferably groups represented by formula (1-R). The larger the number of groups represented by formula (1-R) in formula (1), the more the reduction of the infrared absorbing performance is prevented. It is considered that this is because, as the number of groups represented by formula (1-R) increases, the molecules which permeate the squarylium structure are less likely to approach the squarylium structure and the decomposition of the compound represented by formula (1) is prevented.

In a case where one of $R^b$, $R^c$, and $R^d$ is a group represented by formula (1-R), any of $R^b$, $R^c$, and $R^d$ may be a group represented by formula (1-R). In a case where two of $R^b$, $R^c$, and $R^d$ are a group represented by formula (1-R), any of $R^b$, $R^c$, and $R^d$ may be a group represented by formula (1-R).

In a case where two or more of $R^a$ to $R^d$ are groups represented by formula (1-R), plural structures of the groups represented by formula (1-R) may be the same or different from each other.

In a case where at least one of $R^b$, $R^c$, and $R^d$ is a group represented by formula (1-R), the preferable structure is as described above for $R^a$.

The alkyl group in a case where at least one of $R^b$, $R^c$, and $R^d$ is other than the group represented by formula (1-R) may have any of a straight-chain structure, a branched structure, or a cyclic structure. In this case, the alkyl group preferably has a larger number of branches, and the carbon chain is preferably as short as possible. The number of carbon atoms is preferably from 1 to 10, more preferably from 2 to 8, and even more preferably from 3 to 6.

Specific examples of the alkyl group include a methyl group, an ethyl group, a n-propyl group, a n-butyl group, a n-pentyl group, a n-hexyl group, a sec-butyl group, a 2-methylbutan-2-yl group, a 3-methylbutan-2-yl group, a 3,3-dimethylbutan-2-yl group, a 3-pentyl group, a 2-methylpentan-3-yl group, a 3-methylpentan-3-yl group, cyclopentyl group, a cyclohexyl group, and the like. Among these, a 2-methylbutan-2-yl group and a 3-methylpentan-3-yl group are preferable.

Specific examples of the compound represented by formula (1) are shown below.

Compounds (I-a-1) to (I-a-7), compounds (I-b-1) to (I-b-21), and compounds (I-c-1) to (I-c-21) are compounds having four groups represented by formula (1-R). Compounds (I-d-1) to (I-d-4) are compounds having two groups represented by formula (1-R).

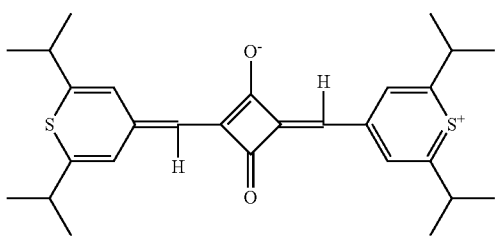
(I-a-1)

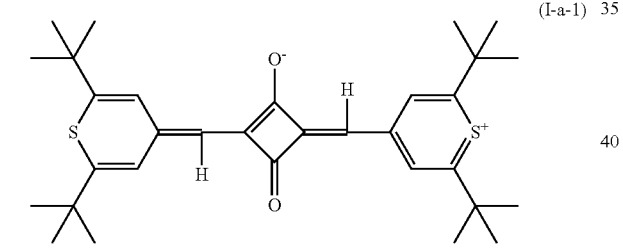
(I-a-2)

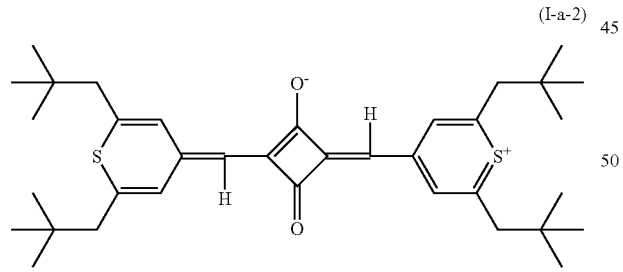
(I-a-3)

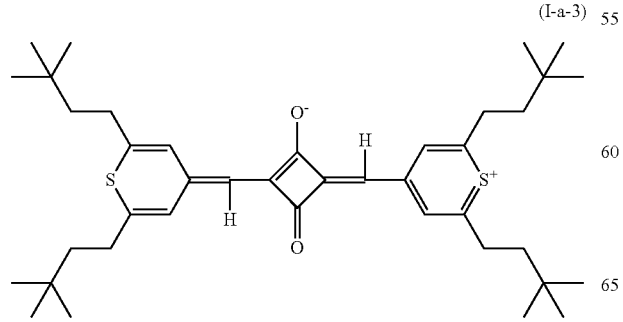

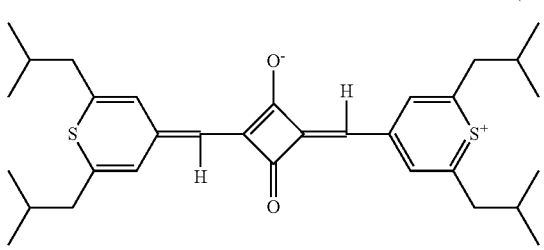
(I-a-4)

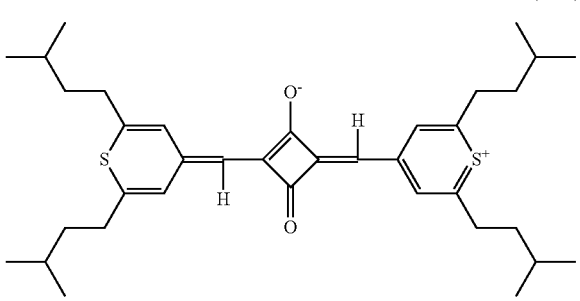
(I-a-5)

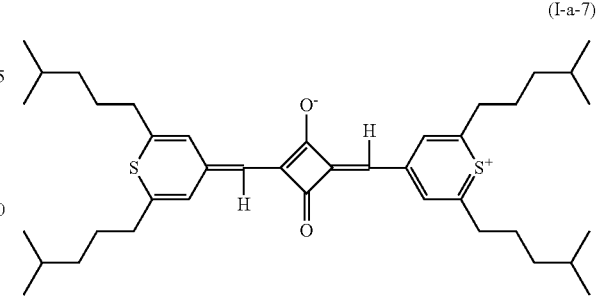
(I-a-6)

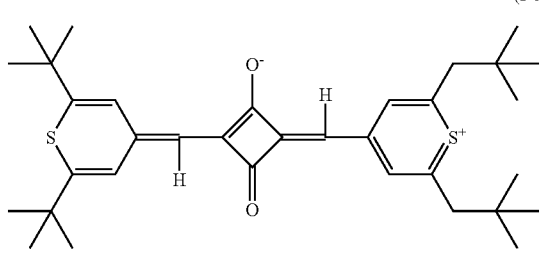
(I-a-7)

(I-b-1)

-continued
(I-b-2)
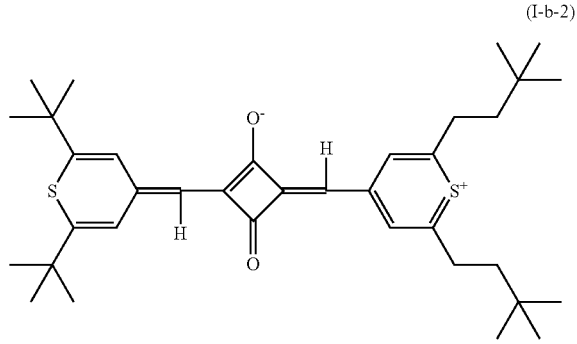
(I-b-7)
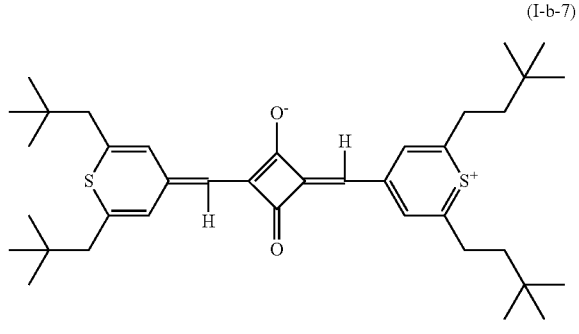
(I-b-3)
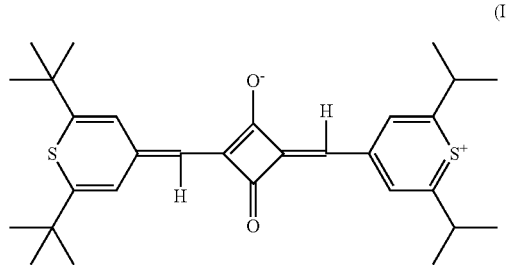
(I-b-8)
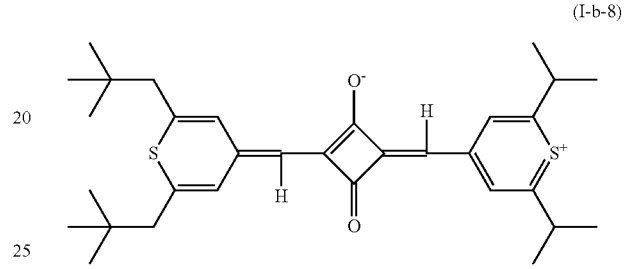
(I-b-4)
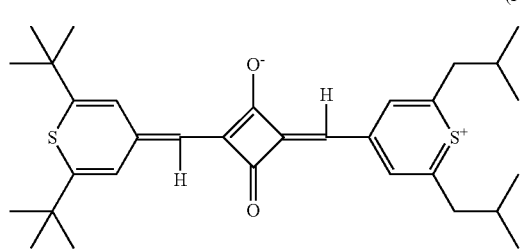
(I-b-9)
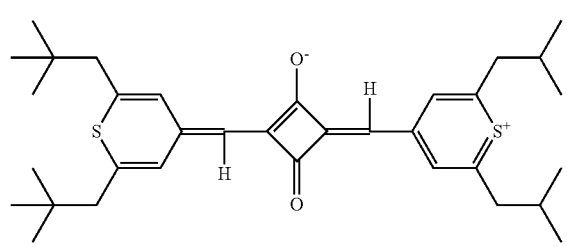
(I-b-5)
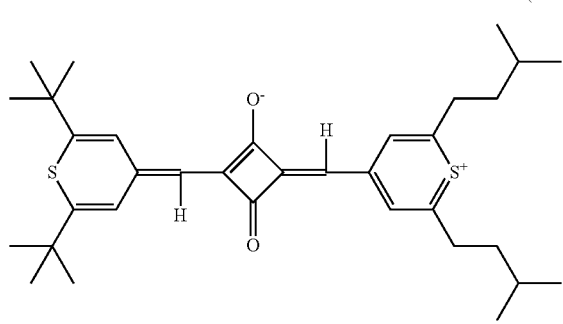
(I-b-10)
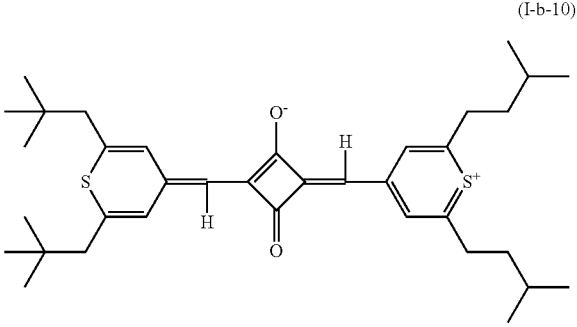
(I-b-6)
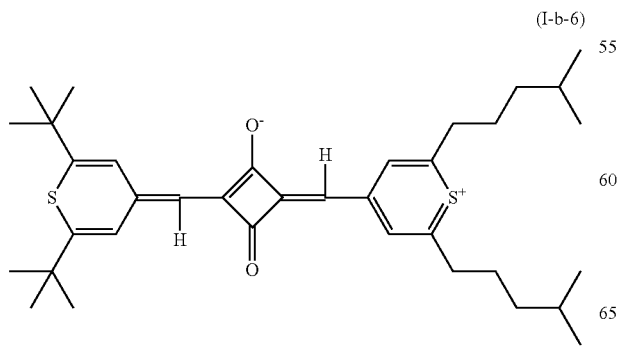
(I-b-11)
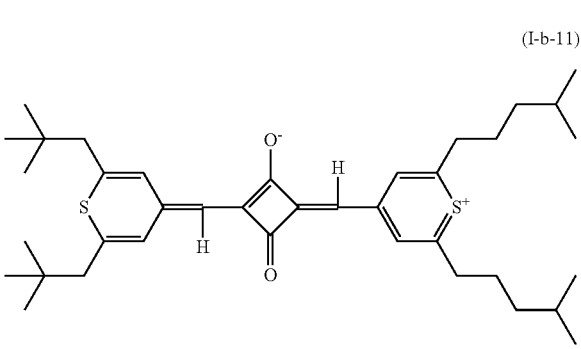

(I-b-12)
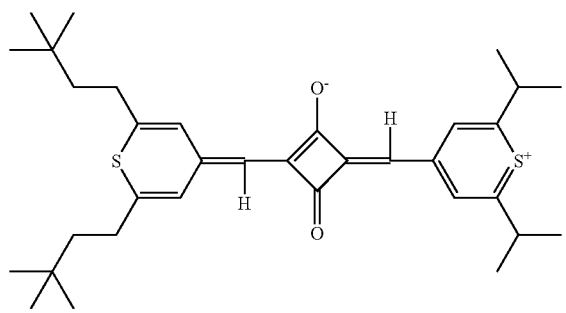
(I-b-13)
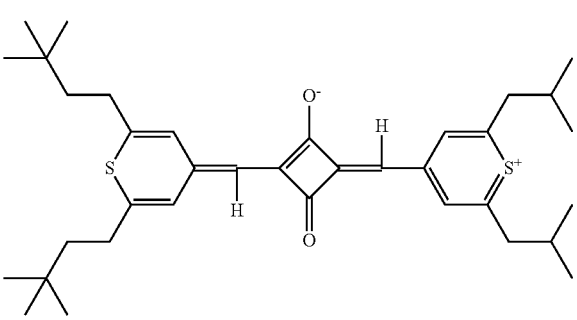
(I-b-14)
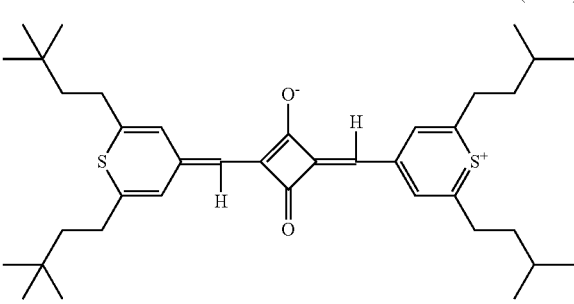
(I-b-15)
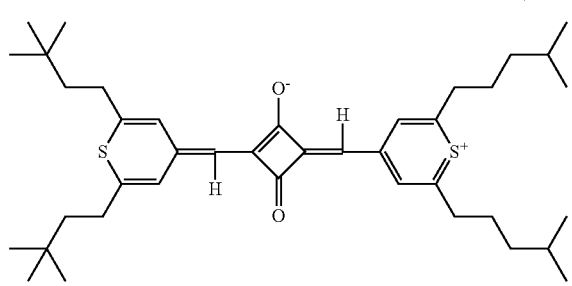
(I-b-16)
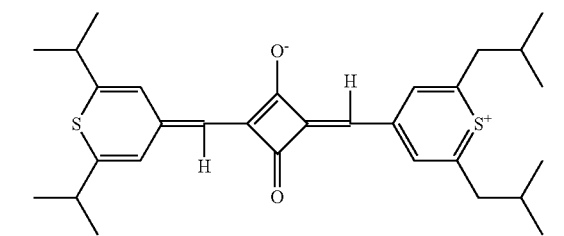
(I-b-17)
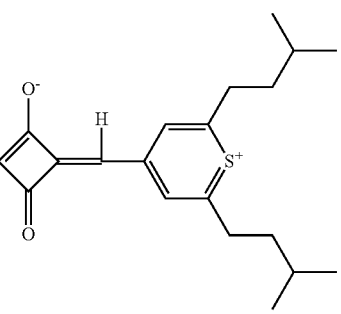
(I-b-18)
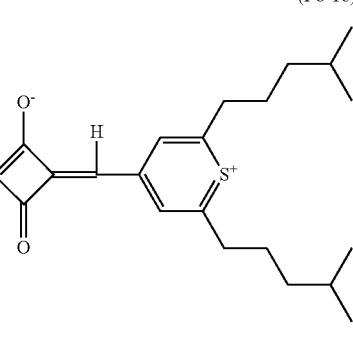
(I-b-19)
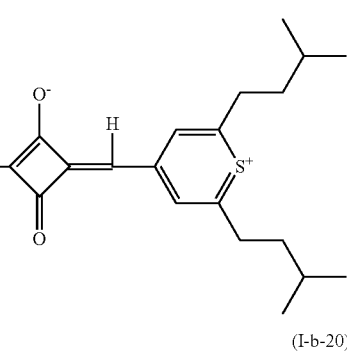
(I-b-20)
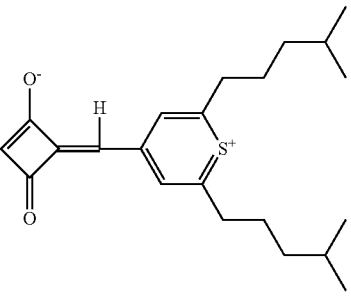
(I-b-21)
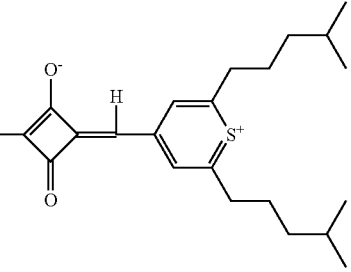

(I-c-1)
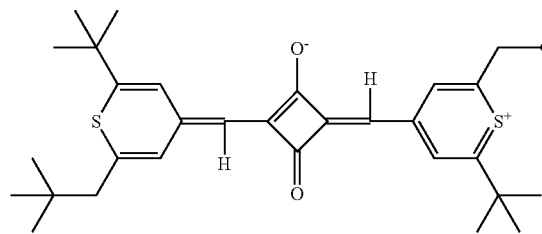
(I-c-2)
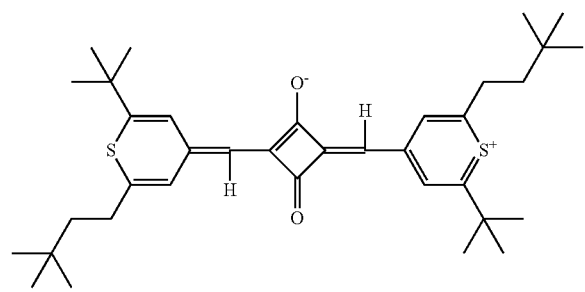
(I-c-3)
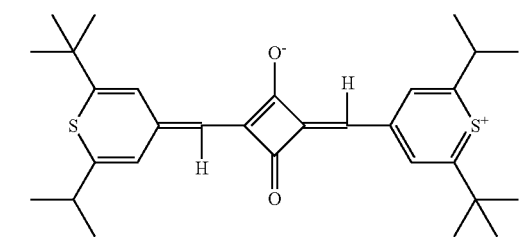
(I-c-4)
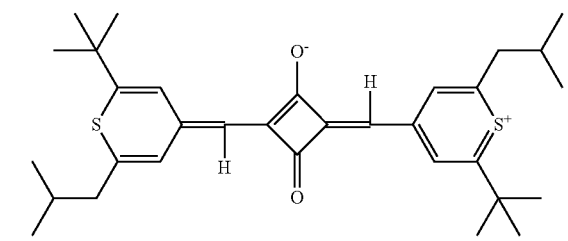
(I-c-5)
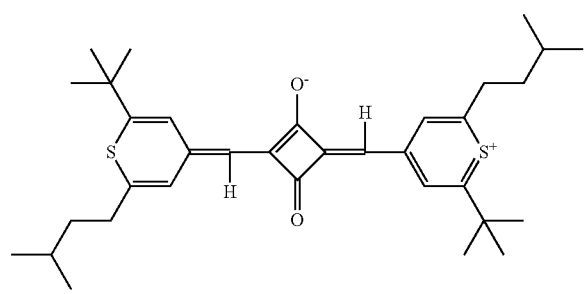
(I-c-6)
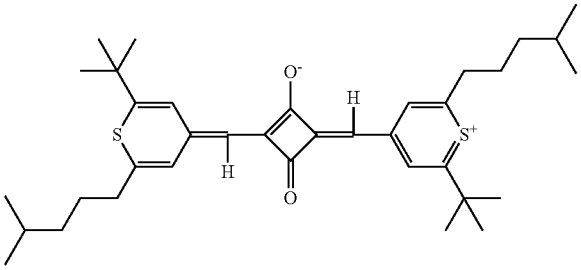
(I-c-7)
(I-c-8)
(I-c-9)
(I-c-10)

(I-c-11)
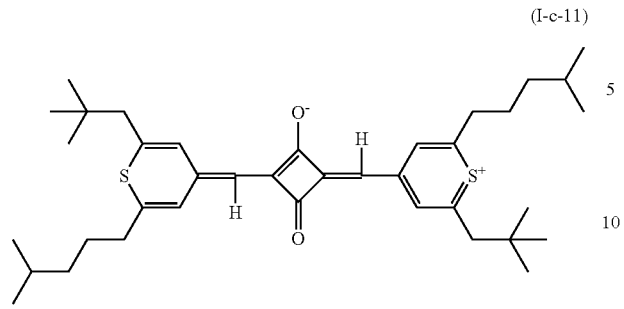
(I-c-12)
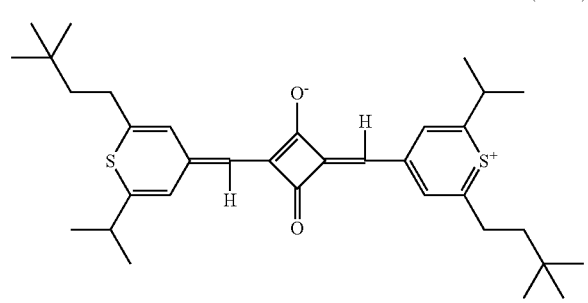
(I-c-13)
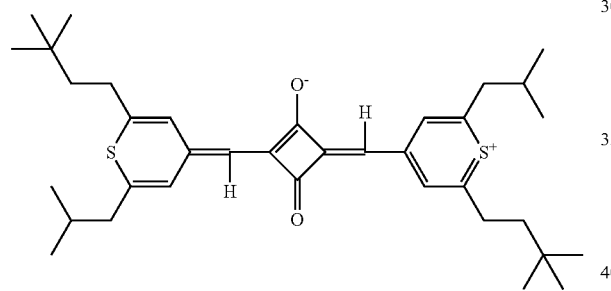
(I-c-14)
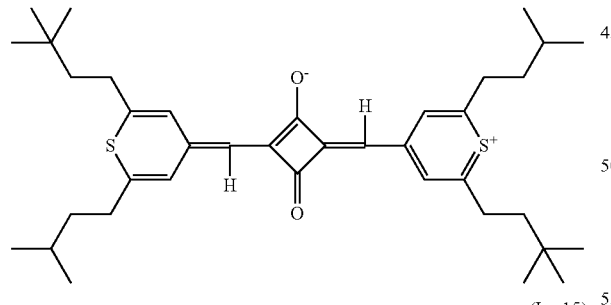
(I-c-15)
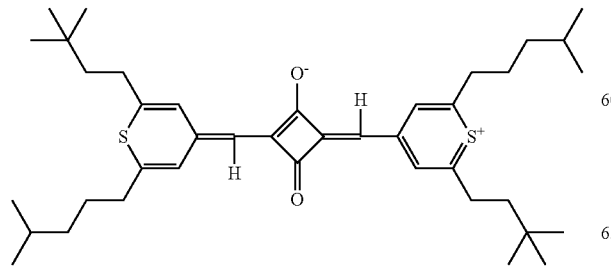
(I-c-16)
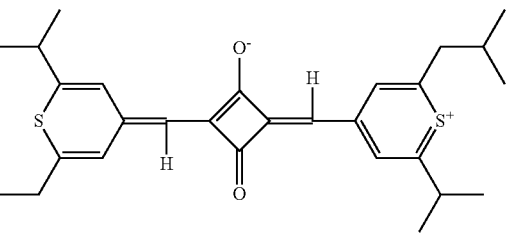
(I-c-17)
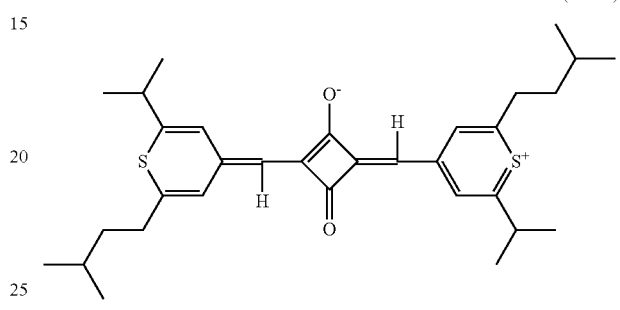
(I-c-18)
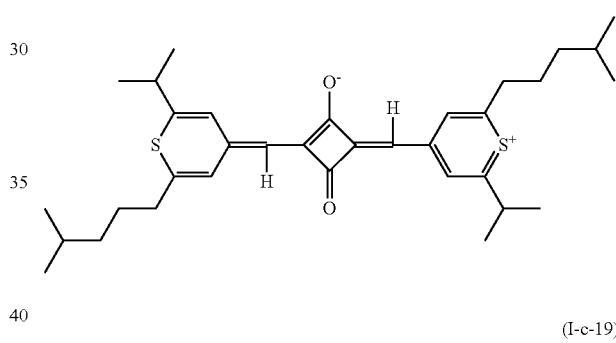
(I-c-19)
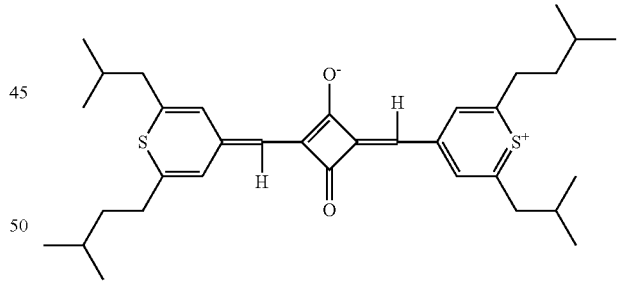
(I-c-20)
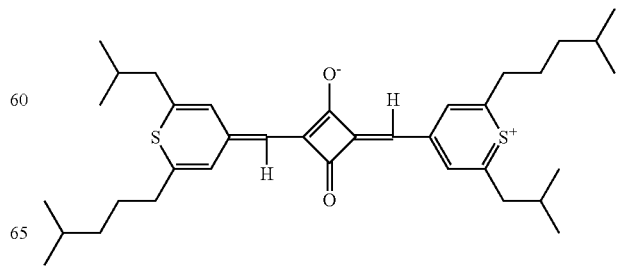

-continued

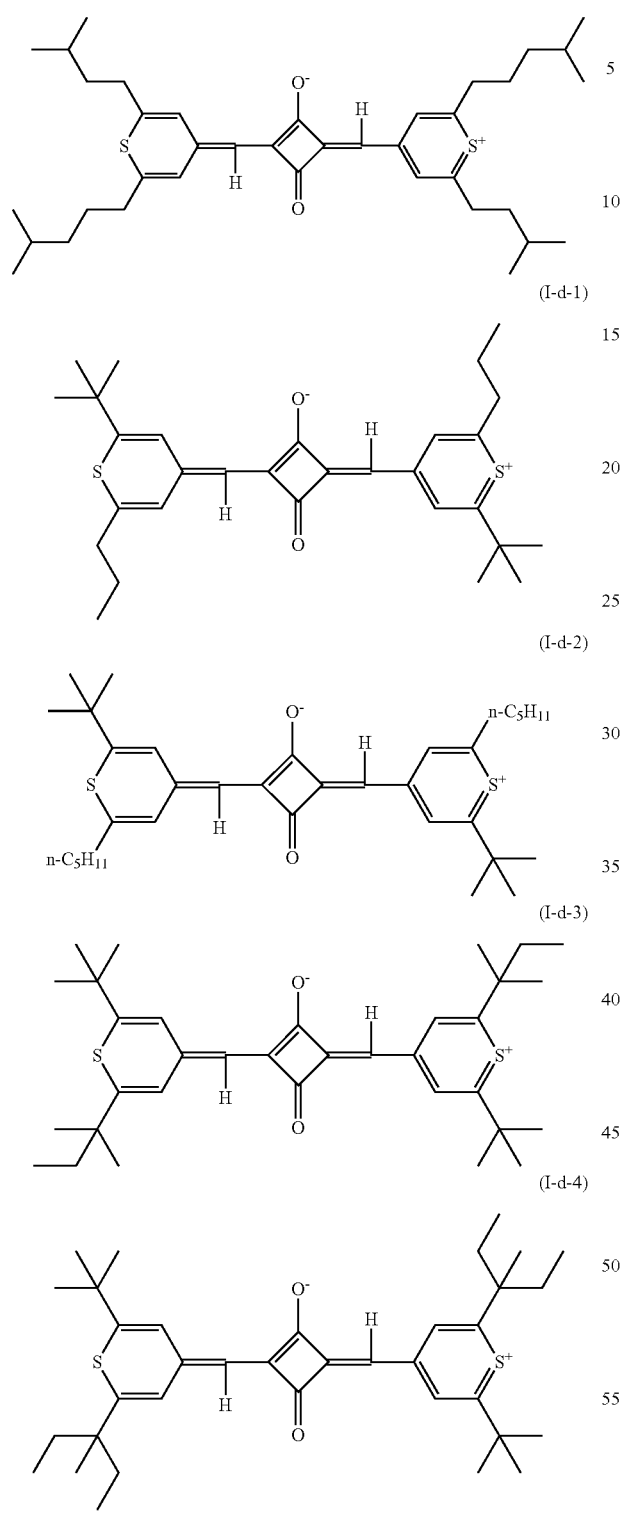

Among the specific examples described above, the compounds (I-a-1) to (I-a-7), the compounds (I-b-1) to (I-b-6), and the compounds (I-c-1) to (I-c-6) are preferable, the compound (I-a-1), the compound (I-b-3), and the compound (I-c-3) are more preferable, and the compound (I-a-1) is most preferable.

The compound represented by formula (1) is synthesized, for example, according to the reaction scheme below.

(1) Compounds in which $R^a$, $R^b$, $R^c$, and $R^d$ are all the Same Group

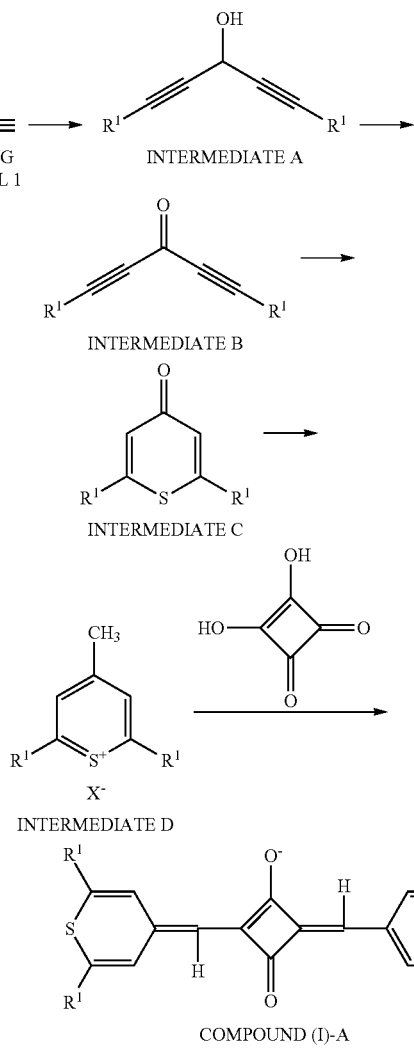

First, a starting material 1 is added dropwise to cause a reaction to an organic solvent (for example, tetrahydrofuran or the like) solution of an organic magnesium halide (Grignard reagent, for example, ethyl magnesium chloride or the like) in an inert atmosphere while cooling. Thereafter, to complete the reaction, the temperature may be returned to room temperature (for example, 20° C. to 25° C., the same applies in the description below) or higher. Next, under cooling, a formic acid derivative (for example, ethyl formate, and the like) is added dropwise to cause a reaction therewith. Thereafter, the temperature may be returned to room temperature or higher to complete the reaction. An organic substance is extracted from the mixture for which the reaction is complete, and an intermediate A is obtained from the separated organic layer.

Next, intermediate A and an oxidizing reagent (for example, manganese oxide or the like) are added to a solvent (for example, cyclohexane or the like), and the mixture is heated for reaction under reflux. Water generated during the reaction may be removed. An intermediate B is obtained from the organic layer of the reaction mixture. Purification may be carried out when obtaining the intermediate B.

Next, a cycloaddition reaction is performed on the intermediate B. For example, sodium monosulfide n hydrate is added to a solvent (for example, ethanol and the like), and the intermediate B is added dropwise under cooling. Thereafter, after a reaction is carried out at room temperature and the solvent is removed from the reaction solution, salt is added until saturation, the liquid phase is separated and the organic phase is collected, and an intermediate C is obtained from the organic phase. Purification may be carried out when obtaining the intermediate C.

Next, in an inert atmosphere, a solvent (for example, anhydrous tetrahydrofuran, and the like) is mixed with the intermediate C, and a Grignard reagent (for example, methylmagnesium bromide or the like) is added dropwise thereto. After completion of the dropwise addition, the reaction solution is heated to reflux, then ammonium bromide is added dropwise under cooling. The separated organic layer is dried and concentrated to obtain an intermediate D.

Next, the intermediate D and squaric acid are dispersed in a solvent (for example, a mixed solvent of cyclohexane and isobutanol, or the like) in an inert atmosphere, a basic compound (for example, pyridine and the like) is added thereto, heated to reflux, and a compound (I)-A is obtained. Water generated during the reaction may be removed. Purification, isolation, concentration, and the like may also be carried out.

(2) Compounds in Which $R^a$ and $R^d$ are the Same Group and $R^b$ and $R^c$ are the Same Group ($R^a$ and $R^b$ are Different Groups)

The process of obtaining the intermediate A in the reaction scheme of (1) described above is changed to the process below.

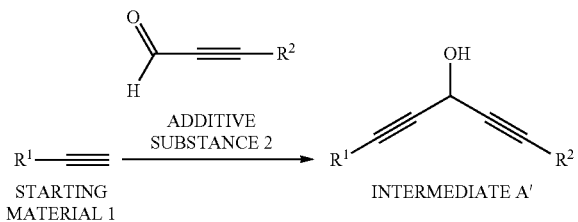

A starting material 1 is added dropwise to an organic solvent (for example, tetrahydrofuran, and the like) solution of a Grignard reagent (for example, ethyl magnesium bromide or the like) in an inert atmosphere while cooling, and then an additive substance 2 is added dropwise thereto to react therewith. A strong acid (for example, hydrochloric acid or the like) is added to the solution after the reaction under cooling, then ether is added at room temperature to obtain an intermediate A' from the organic layer. Purification may be carried out when obtaining the intermediate A'.

(3) Compounds in which $R^a$ and $R^b$ are the Same Group and $R^c$ and $R^d$ are the Same Group ($R^a$ and $R^c$ are Different Groups)

As the intermediate D in the reaction scheme of (1) described above, two types of a compound in which the structure of R1 is different are prepared, and the two compounds are reacted with squaric acid to obtain a compound represented by formula (1).

It is also possible to synthesize compounds in which three of $R^a$ to $R^d$ are the same group, compounds in which two are the same group and the remaining two are different groups, and compounds in which all four groups are different from each other according to the reaction scheme described above.

The maximum absorption wavelength ($\lambda_{max}$) of the compound represented by formula (1) (in a tetrahydrofuran solution) is preferably from 760 nm to 1,200 nm, more preferably from 780 nm to 1,100 nm, and even more preferably from 800 nm to 1,000 nm.

The molar extinction coefficient (ε max) at the maximum absorption wavelength ($\lambda_{max}$) of the compound represented by formula (1) (in a tetrahydrofuran solution) is preferably from $1\times10^3$ Lmol$^{-1}$ cm$^{-1}$ to $6\times10^5$ L mol$^{-1}$ cm$^{-1}$, more preferably from $2\times10^3$ Lmol$^{-1}$ cm$^{-1}$ to $6\times10^3$ Lmol$^{-1}$ cm$^{-1}$, and still more preferably from $2.5\times10^5$ Lmol$^{-1}$ cm$^{-1}$ to $6\times10^3$ Lmol$^{-1}$ cm$^{-1}$.

[Specific Polymer]

In the exemplary embodiment, the specific polymer acts as a dispersing agent for the compound represented by formula (1). The specific polymer is polyurethane, polyester, polyamide, polyurea, or polycarbonate with an acid value of from 5 mg KOH/g to 50 mg KOH/g. The lower limit of the acid value of the specific polymer is more preferably 8 mg KOH/g or more, and even more preferably 10 mg KOH/g or more, and the upper limit is more preferably 40 mg KOH/g or less, and even more preferably 30 mg KOH/g or less.

In the exemplary embodiment, the acid value of the polymer is a value determined by a neutralization titration method defined in JIS K 0070: 1992.

Examples of the of specific polymer include a polymer having a dissociable group and dispersed in an aqueous medium by the action of the dissociable group; and a polymer having a non-dissociating dispersing group (for example, a polyethyleneoxy group) and dispersed in an aqueous medium by the action of the group. The specific polymer may be a polymer which is dispersed in a liquid state in an aqueous medium or a polymer which is dispersed in a solid state in an aqueous medium, and from the viewpoint of dispersion stability, a polymer which is dispersed in a solid state in an aqueous medium is preferable.

From the viewpoint of dispersibility in an aqueous medium, the specific polymer preferably has a dissociable group. Examples of the dissociable group include anionic groups such as a carboxy group, a sulfonic acid group, a sulfinic acid group, a sulfuric acid monoester group, a phosphoric acid group, or a salt thereof (for example, an alkali metal salt such as Na or K, an ammonium salt such as ammonia, dimethylamine, ethanolamine, diethanol amine, triethanol amine, and trimethyl amine), and cationic groups such as primary, secondary, and tertiary amines, and quaternary ammonium salts. Among these, an anionic group is preferable, and a carboxy group and a sulfonic acid group are particularly preferable.

The dissociable group in the specific polymer may be a group in which the group of the raw material monomer is introduced as a side chain of the polymer, may be a group remaining as an unreacted terminal of the main chain, or may be a group in which a compound (for example, maleic anhydride) is introduced by being reacted with a reactive group (for example, a hydroxyl group or an amino group) remaining after polymerization of the polymer.

From the viewpoint that a dissociable group is easily introduced and from the viewpoint of good compatibility with the compound represented by formula (1), polyurethane and polyester are preferable as the specific polymer among polyurethanes, polyesters, polyamides, polyureas, and polycarbonates. One of the specific polymers may be used, or two or more thereof may be used in combination.

Polyurethane

Polyurethane is generally synthesized by a polyaddition reaction of a diol, and a diisocyanate.

From the viewpoint of dispersibility in an aqueous medium, the polyurethane preferably has a dissociable group. As the dissociable group, an anionic group is preferable, and a carboxy group and a sulfonic acid group are particularly preferable. Introduction of the dissociable group into the polyurethane is carried out, for example, by using a diol having a dissociable group as a raw material for polyaddition reaction.

Examples of a diol having a dissociable group include 2,2-bis (hydroxymethyl) propionic acid, 2,2-bis (hydroxymethyl) butanoic acid, 2,5,6-trimethoxy-3,4-dihydroxyhexanoic acid, 2,3-dihydroxy-4,5-dimethoxypentanoic acid, 2,4-di(2-hydroxy) ethyloxycarbonylbenzenesulfonic acid, salts thereof, and the like. One of the diols having a dissociable group may be used, or two or more thereof may be used in combination.

Examples of diols having no dissociable group include ethylene glycol, 1,2-propanediol, 1,3-propanediol, 1,2-butanediol, 1,3-butanediol, 2,3-butanediol, 2,2-dimethyl-1,3-propanediol, 1,2-pentanediol, 1,4-pentanediol, 1,3-pentanediol, 2,4-pentanediol, 3,3-dimethyl-1,2-butanediol, 2-ethyl-2-methyl 1,3-propanediol, 1,2-hexanediol, 1,5-hexanediol, 1,6-hexanediol, 2,5-hexanediol, 2-methyl-2,4-pentanediol, 2,2-diethyl-1,3-propanediol, 2,4-dimethyl-2,4-pentanediol, 1,7-heptanediol, 2-methyl 2-propyl-1,3-propanediol, 2,5-dimethyl-2,5-hexanediol, 2-ethyl 3-hexanediol, 1,2-octanediol, 1,8-octanediol, 2,2,4-trimethyl-1,3-pentanediol, 1,4-cyclohexane dimethanol, hydroquinone, diethylene glycol, triethylene glycol, dipropylene glycol, tripropylene glycol, polyethylene glycol, polypropylene glycol, poly(oxytetramethylene) glycol, polyester polyol, 4,4'-dihydroxy-diphenyl-2,2-propane, 4,4'-dihydroxyphenylsulfone, and the like. One diol having no dissociable group may be used, or two or more dials may be used in combination.

Examples of diisocyanates include diisocyanates such as methylene diisocyanate, ethylene diisocyanate, isophorone diisocyanate, hexamethylene diisocyanate, 1,4-cyclohexane diisocyanate, 2,4-toluene diisocyanate, 2,6-toluene diisocyanate, 1,3-xylylene diisocyanate, 1,5-naphthalene diisocyanate, m-phenylene diisocyanate, p-phenylene diisocyanate, 3,3-dimethyl-4,4-diphenylmethane diisocyanate, 3,3'-dimethylbiphenylene diisocyanate, 4,4'-biphenylene diisocyanate, dicyclohexylmethane diisocyanate, methylene bis (4-cyclohexyl isocyanate), and the like. One of the diisocyanates may be used, or two or more thereof may be used in combination.

Polyester

Polyester is generally synthesized by dehydration condensation of a dicarboxylic acid and a diol.

From the viewpoint of dispersibility in an aqueous medium, the polyester preferably has a dissociable group. As the dissociable group, an anionic group is preferable, and a carboxy group and a sulfonic acid group are particularly preferable. Introduction of the dissociable group into the polyester is carried out, for example, by using a dicarboxylic acid or a diol having a sulfonic acid group as a raw material for dehydration condensation.

Examples of the dicarboxylic acid having a sulfonic acid group include 3-sulfophthalic acid, 4-sulfophthalic acid, 4-sulfoisophthalic acid, 5-sulfoisophthalic acid, 2-sulfoterephthalic acid, sulfosuccinic acid, 4-sulfo-1,8-naphthalenedicarboxylic acid, 7-sulfo-1,5-naphthalenedicarboxylic acid, 2,4-di(2-hydroxy)ethyloxycarbonylbenzenesulfonic acid, salts thereof, and the like. One of these dicarboxylic acids may be used, or two or more thereof may be used in combination.

Examples of the other dicarboxylic acid include oxalic acid, malonic acid, succinic acid, glutaric acid, dimethylmalonic acid, adipic acid, pimelic acid, α,α-dimethylsuccinic acid, acetone dicarboxylic acid, sebacic acid, 1,9-nonanedicarboxylic acid, fumaric acid, maleic acid, itaconic acid, citraconic acid, phthalic acid, isophthalic acid, terephthalic acid, 2-butyl terephthalic acid, tetrarchloroterephthalic acid, acetylene dicarboxylic acid, poly(ethylene terephthalate) dicarboxylic acid, 1,2-cyclohexanedicarboxylic acid, 1,4-cyclohexanedicarboxylic acid, ω-poly (ethylene oxide) dicarboxylic acid, p-xylylene dicarboxylic acid, and the like. These dicarboxylic acids may be subjected to dehydration condensation in the form of alkyl esters, acid chlorides, or acid anhydrides. One of these dicarboxylic acids may be used, or two or more thereof may be used in combination.

Examples of the diol having a sulfonic acid group and other diols include the above compounds mentioned as raw materials for polyurethane. One of the diols may be used, or two or more thereof may be used in combination.

Polyamide is generally synthesized by polycondensation of diamine and dicarboxylic acid, polycondensation aminocarboxylic acid, ring-opening polymerization of lactams, or a combination thereof.

From the viewpoint of dispersibility in an aqueous medium, the polyamide preferably has a dissociable group. As the dissociable group, an anionic group is preferable, and a carboxy group and a sulfonic acid group are particularly preferable. Introduction of the dissociable group into the polyamide is carried out, for example, by using a dicarboxylic acid having a sulfonic acid group as a raw material for polycondensation.

Examples of the diamine include ethylenediamine, 1,3-propanediamine, 1,2-propanediamine, hexamethylenediamine, octamethylenediamine, o-phenylenediamine, m-phenylenediamine, p-phenylenediamine, piperazine, 2,5-dimethylpiperazine, 4,4'-diaminodiphenyl ether, 3,3'-diaminodiphenylsulfone, xylylenediamine, and the like. One of the diamines may be used, or two or more thereof may be used in combination.

Examples of the dicarboxylic acid having a sulfonic acid group and other dicarboxylic acids include the compounds described above as raw materials for polyester. One of the dicarboxylic acids may be used, or two or more thereof may be used in combination.

Examples of the aminocarboxylic acid include glycine, alanine, phenylalanine, ω-aminohexanoic acid, ω-aminodecanoic acid, ω-aminoundecanoic acid, anthranilic acid and the like. One of the aminocarboxylic acids may be used, or two or more thereof may be used in combination.

Examples of lactams include ε-caprolactam, azetidinone, pyrrolidone, and the like. One of the lactams may be used, or two or more thereof may be used in combination.

—Polyurea—

Polyurea is generally synthesized by a polyaddition reaction of a diamine and a diisocyanate, a deammoniation reaction of a diamine and a urea, or a combination of these reactions.

From the viewpoint of dispersibility in an aqueous medium, the polyurea preferably has a dissociable group. As the dissociable group, an anionic group is preferable, and a carboxy group and a sulfonic acid group are particularly preferable. The introduction of the dissociable group into the polyurea is carried out, for example, by adding alcohol or amine having a dissociable group to the isocyanate at the terminal of the polymer.

Examples of the diamine include the compounds described above as raw materials for polyamide. One of the diamines may be used, or two or more thereof may be used in combination.

Examples of the diisocyanate include the compounds described above as raw materials for polyurethane. One of of the diisocyanate may be used, or two or more thereof may be used in combination.

Examples of the compound for introducing a dissociable group into polyurea include 1-aminocyclohexanecarboxylic acid, 12-aminododecanoic acid, 6-aminohexanoic acid, m-aminobenzenesulfonic acid, 3-amino-1-propanesulfonic acid, and the like. One of these compounds may be used, or two or more of these compounds may be used in combination.

—Polycarbonate—

Polycarbonate is generally synthesized by the reaction of a diol with phosgene or a carbonate ester derivative.

From the viewpoint of dispersibilty in an aqueous medium, polycarbonate preferably has a dissociable group. As the dissociable group, an anionic group is preferable, and a carboxy group and a sulfonic acid group are particularly preferable. The introduction of the dissociable group into the polycarbonate is carried out, for example, by using a diol having a dissociable group as a raw material for polycondensation.

Examples of a diol having a dissociable group and a diol not having a dissociable group include the above compounds as raw materials for polyurethane. One of the diols may be used, or two or more thereof may be used in combination.

Examples of the carbonate ester derivative include aromatic esters such as diphenyl carbonate. One of the carbonate ester derivatives may be used, or two or more thereof may be used in combination.

For the specific polymer, the monomer types are selected and synthesized from the viewpoint of controlling, for example, the acid value of the specific polymer, the glass transition temperature, the solubility in an organic solvent, the affinity for the compound represented by formula (1), and the like.

Specific examples of the specific polymer are given below by describing the polymerization components. However, regardless of polymerization components, for polymers prepared by a condensation reaction of polyester, polyamide and the like, description will be given of dicarboxylic acids, diols, diamines, hydroxycarboxylic acids, aminocarboxylic acids, and the like which are the constituent units of the polymer. In the parentheses are the molar ratios of the polymerization components. The present invention is not limited to these specific examples.

—Polyurethane—

P-1: toluene diisocyanate/ethylene glycol/1,4-butanediol (50/15/35)

P-2: 4,4'-diphenylmethane diisocyanate/1,3-propanediol/polypropylene glycol (Mw 1,000) (50/45/5)

P-3: toluene diisocyanate/hexamethylene diisocyanate/ethylene glycol/polyethylene glycol (Mw 600)/1,4-butanediol (40/10/20/10/20)

P-4: 1,5-naphthylene diisocyanate/hexamethylene diisocyanate/diethylene glycol/1,6-hexanediol (25/25/35/15)

P-5: 4,4'-diphenylmethane diisocyanate/hexamethylene diisocyanate/tetraethylene glycol/ethylene glycol/2,2-bis (hydroxymethyl) propionic acid (40/10/20/20/10)

P-6: 4,4'-diphenylmethane diisocyanate/hexamethylene diisocyanate/butanediol/ethylene glycol/2,2-bis (hydroxymethyl) propionic acid (40/10/20/20/10)

P-7: 1,5-naphthylene diisocyanate/butanediol/2,2'-bis (4-hydroxyphenyl) propane/polypropylene glycol (Mw 400)/2,2-bis (hydroxymethyl) propionic acid (50/20/5/10/15)

P-8: 1,5-naphthylene diisocyanate/hexamethylene diisocyanate/2,2-bis (hydroxymethyl) butanoic acid/polybutylene oxide (Mw 500) (35/15/25/25)

P-9: isophorone diisocyanate/diethylene glycol/neopentyl glycol/2,2-bis(hydroxymethyl) propionic acid (50/20/20/10)

P-10: toluene diisocyanate/2,2-bis (hydroxymethyl) butanoic acid/polyethylene glycol (Mw 1,000)/cyclohexane dimethanol (50/10/10/30)

P-11: diphenylmethane diisocyanate/hexamethylene diisocyanate/tetraethylene glycol/butanediol/2,4-di(2-hydroxy) ethyloxycarbonylbenzenesulfonic acid (40/10/10/33/7)

P-12: diphenylmethane diisocyanate/hexamethylene diisocyanate/butanediol/ethylene glycol/2,2-bis (hydroxymethyl) butanoic acid/2,4-di(2-hydroxy) ethyloxycarbonylbenzenesulfonic acid (40/10/20/15/10/5)

P-39: isophorone diisocyanate/poly(oxytetramethylene) glycol (Mn 2,000)/neopentyl glycol/2,2-bis (hydroxymethyl) propionic acid (50/9.5/6.2/34.3)

P-40: isophorone diisocyanate/polypropylene glycol (Mn 1,000)/neopentyl glycol/2,2-bis (hydroxymethyl) propionic acid (50/20/15/15)

P-41: isophorone diisocyanate/poly(oxytetramethylene) glycol (Mn 2,000)/triethylene glycol/2,4-di(2-hydroxy) ethyloxycarbonylbenzenesulfonic acid (50/20/18/12)

—Polyester—

P-13: terephthalic acid/isophthalic acid/cyclohexanedimethanol/1,4-butanediol/ethylene glycol (25/25/25/15/10)

P-14: terephthalic acid/isophthal acid/2,2'-his (4-hydroxyphenyl) propane/tetraethylene glycol/ethylene glycol (30/20/20/15/15)

P-15: terephthalic acid/isophthalic acid/cyclohexanedimethanol/neopentyl glycol/diethylene glycol (20/30/25/15/10)

P-16: terephthalic acid/isophthalic acid/4,4-benzenedimethanol/diethylene glycol/neopentyl glycol (25/25/25/15/10)

P-17: terephthalic acid/isophthalic acid/5-sulfoisophthalic acid/ethylene glycol/neopentyl glycol (24/24/2/25/25)

P-18: terephthalic acid/isophthalic acid/5-sulfoisophthalic acid/cyclohexane dimethanol/1,4-butanediol/ethylene glycol (22/22/6/25/15/10)

P-19: isophthalic acid/5-sulfoisophthalic acid/cyclohexanedimethanol/ethylene glycol (40/10/40/10)

P-20: cyclohexanedicarboxylic acid/isophthalic acid/2,4-di(2-hydroxy) ethyloxycarbonylbenzenesulfonic acid/cyclohexanedimethanol/ethylene glycol (30/20/5/25/20)

—Polyamide—

P-21: 11-aminoundecanoic acid (100)

P-22: 12-aminododecanoic acid (100)

P-23: reaction product: of poly (12-aminododecanoic acid) and maleic anhydride

P-24: 11-aminoundecanoic acid/7-aminoheptanoic acid (50/50)

P-25: hexamethylenediamine/adipic acid (50/50)

P-26: tetramethylenediamine/adipic acid (50/50)

P-27: hexamethylenediamine/sebacic acid (50/50)

P-28: N,N-dimethylethylenediamine/adipic acid/cyclohexanedicarboxylic acid (50/20/30)

—Polyurea—

P-32: toluene diisocyanate/hexamethylenediamine/2,2-bis (hydroxymethyl) propionic acid (50/40/10)

P-33: 11-aminoundecanoic acid/hexamethylenediamine/urea (33/33/33)

—Polycarbonate—

P-42: 1,6-hexanediol polycarbonate diol with phthalic anhydride at one terminal (Mw 2,000)

P-43: 1,6-hexanediol/1,4-butanediol (molar ratio 1:1) polycarbonate diol with phthalic anhydride at one terminal (Mw 2,000)

P-44: 1,6-hexanediol/1,5-heptanediol (molar ratio 1:1) polycarbonate diol with phthalic anhydride at one terminal (Mw 2,000)

The molecular weight range of the specific polymer is preferably from 1,000 to 200,000, more preferably from 1,500 to 100,000, and even more preferably from 2,000 to 50,000 in terms of weight average molecular weight. Since the weight average molecular weight is 1,000 or more, the content ratio of the water-soluble component described below is reduced, and the specific polymer is suitable for dispersing the compound represented by formula (1). On the other hand, by the weight average molecular weight being 200,000 or less, an organic solvent is excellent and the viscosity of a polymer solution dissolved in an organic solvent is prevented, thus when an infrared absorbing particle dispersion is prepared, the dispersion into the aqueous medium is easy and the dispersion stability of the infrared absorbing particles is excellent as a result.

The weight average molecular weight of the polymer is measured by gel permeation chromatography (GPC) and calculated in terms of polystyrene.

The glass transition temperature of the specific polymer is preferably from 40° C. to 150° C. The glass transition temperature being 40° C. or more provides an excellent scratch resistance and blocking resistance of an image formed using an ink containing a specific polymer, and the glass transition temperature being 150° C. or less provides an excellent abrasion resistance of the image formed using an ink which includes a specific polymer. From this viewpoint, the glass transition temperature of the specific polymer is more preferably from 60° C. to 140° C., and even more preferably from 70° C. to 130° C.

When the specific polymer is formed into a polymer dispersion, the ratio of the water-soluble component to the solid content included in the dispersion is preferably 10% by weight or less.

Normally, the individual molecules forming the aggregate of the polymer have variations in the composition of the constituent units and, accordingly, the solubility of the individual molecules in water varies. A polymer molecule having a relatively high solubility in water corresponds to the "water-soluble component" referred to herein. Since a water-soluble component, that is, a polymer molecule having a relatively high solubility in water is not suitable for dispersing the compound represented by formula (1), when the specific polymer is formed into a polymer dispersion, the water-soluble component included in the dispersion is preferably as little as possible. In addition, also from the viewpoint of preventing the swelling of particles containing a specific polymer and the adhesion between particles and maintaining a stable dispersion, when the specific polymer is formed into a polymer dispersion, the water-soluble component included in the dispersion is preferably as little as possible. From these viewpoints, when a specific polymer is formed into a dispersion, the ratio of the water-soluble component to the solid content included in the dispersion is preferably 10% by weight or less, more preferably 8% by weight or less, even more preferably 5% by weight or less, and the smaller the better.

The content ratio of the water-soluble component is measured by the following method.

A polymer dispersion (solid content concentration: 10% by weight, liquid temperature: 23±0.5° C.) in which a polymer is dispersed in water is prepared. At that time, a neutralizing agent is used as necessary for dispersion of the polymer. The polymer dispersion is centrifuged into a dispersoid and a medium using a centrifugal ultrafiltration filter unit, the separated medium is dried, the mass of dry matter is dried, and the ratio of the dried solid content of the medium with respect to the solid content of the polymer dispersion (the amount of the polymer used for preparing the polymer dispersion+the weight of the neutralizing agent used in the process of preparing the polymer dispersion) is calculated and set as the ratio (% by weight) of the water-soluble component.

[Aqueous Medium]

The medium of the infrared absorbing particle dispersion according to the exemplary embodiment is water or a mixed solvent containing water as a main solvent. The mixed solvent is, for example, a mixture of water and a water-soluble organic solvent.

As water, purified water such as distilled water, ion exchanged water, ultra-filtered water, or the like is preferable from the viewpoint of preventing the introduction of impurities or the generation of microorganisms.

Examples of water-soluble organic solvents include alcohols, polyols, polyol derivatives, nitrogen-containing solvents, sulfur-containing solvents, and the like. The water-soluble organic solvent included in the infrared absorbing particle dispersion is, for example, a residue of the organic solvent used for dissolving the compound represented by formula (1) or the specific polymer in the process of preparing the infrared absorbing particle dispersion.

The content of water is preferably from 50% by weight to 95% by weight with respect to the total weight of the infrared absorbing particle dispersion, and more preferably from 60% by weight to 90% by weight.

The content of the water-soluble organic Solvent is preferably 30% by weight or less with respect to the total weight of the infrared absorbing particle dispersion, and more preferably 10% by weight or less.

[Other Components]

The infrared absorbing particle dispersion according to the exemplary embodiment may include a compound having an infrared absorbing ability other than the compound represented by formula (1) (for example, a squarylium dye, a croconium dye, naphthalocyanine dye, cyanine dye, aminium dye, and the like), a compound having an ultra-violet ray absorbing ability (for example, a benzotriazole type compound, benzophenone compound, and the like), a coloring agent, a neutralizing agent, a surfactant, a dispersion stabilizer, a polymer other than the specific polymer, or the like.

[Method for Preparing Infrared Absorbing Particle Dispersion]

Examples of a method for preparing the infrared absorbing particle dispersion include a phase inversion emulsification method, an impregnation method in which particles of a specific polymer are impregnated with a compound having an infrared absorbing ability, and the phase inversion emulsification method is preferable.

The phase inversion emulsification method is a method in which a solution is prepared in which a compound having an infrared absorbing ability and a specific polymer are dissolved in an organic solvent, a neutralizing agent is added to this solution to neutralize the specific polymer, then water is slowly mixed therein, and particles are formed containing both of the compound having an infrared absorbing ability and the specific polymer and in a dispersion state. The dispersion state here may be an emulsion in which liquid particles are dispersed, or a suspension in which solid particles are dispersed, and from the viewpoint of dispersion stability, a suspension in which solid particles are dispersed is preferable. In a case where the solubility of the organic solvent in water is 10% by weight or less, or in a case where the vapor pressure of the organic solvent is larger than water, the organic solvent is preferably removed from the viewpoint of dispersion stability of the infrared absorbing particles. Neutralization is not an essential step; however, in a case where the specific polymer has a non-neutralized dissociable group, neutralization is preferably carried out from the viewpoint of pH adjustment of the dispersion and the like.

The impregnation method is a method in which a particle dispersion of a specific polymer is prepared, the particle dispersion and a solution of a compound having an infrared absorbing ability dissolved in an organic solvent are mixed, and then the organic solvent is slowly removed, and the compound having an infrared absorbing ability is impregnated into particles of a specific polymer to obtain infrared absorbing particles. Particles of the specific polymer may be liquid particles or may be solid particles, and from the viewpoint of dispersion stability, solid particles are preferable. The particle dispersion of the specific polymer is prepared, for example, by preparing a solution in which a specific polymer is dissolved, neutralizing the solution by adding a neutralizing agent thereto, and then removing the organic solvent while slowly mixing water therein.

The organic solvent used for the phase inversion emulsification method and the impregnation method is selected based on the solubility of the compound represented by formula (1) and the solubility of the specific polymer. Specific examples thereof include ketone solvents such as acetone, methyl ethyl ketone, diethyl ketone and the like; alcohol solvents such as methanol, ethanol, 2-propanol, 1-propanol, 1-butanol, and tert-butanol; chlorine solvents such as chloroform and methylene chloride; aromatic solvents such as benzene and toluene; ester solvents such as ethyl acetate, butyl acetate, and isopropyl acetate; ether solvents such as diethyl ether, tetrahydrofuran, and dioxane; glycol ether solvents such as ethylene glycol monomethyl ether, ethylene glycol dimethyl ether; and the like. One of these organic solvents may be used, or two or more thereof may be used in combination.

The amount of the organic solvent used is preferably from 10 parts by weight to 2,000 parts by weight with respect to 100 parts by weight of the specific polymer, and more preferably from 100 parts by weight to 1,000 parts by weight. When the amount of the organic solvent used is 10 parts by weight or more with respect to 100 parts by weight of the specific polymer, the dispersion of the particles is stabilized and when the amount of the organic solvent used is 2,000 parts by weight or less with respect to 100 parts by weight of the specific polymer, a step of removing the organic solvent is unnecessary or is completed in a short time.

Examples of the neutralizing agent used in the phase inversion emulsification method and the impregnation method include an organic base and an inorganic alkali in a case where the specific polymer has an anionic group. Examples of the organic base include triethanolamine, diethanolamine, N-methyldiethanolamine, dimethylethanolamine, and the like. Examples of the inorganic alkali include hydroxides of alkali metals (for example, sodium hydroxide, lithium hydroxide, potassium hydroxide, and the like), carbonates (for example, sodium carbonate, sodium hydrogen carbonate, and the like), ammonia, and the like.

From the viewpoint of the dispersion stability of the infrared absorbing particles, the addition amount of the neutralizing agent is preferably such that the pH of the infrared absorbing particle dispersion is within the range described below.

The amount of the specific polymer used in the phase inversion emulsification method and the impregnation method and the content of the specific polymer included in the infrared absorbing particle dispersion are preferably from 100 parts by weight to 9,900 parts by weight with respect to 100 parts by weight of the compound having the infrared absorbing property, and more preferably from 300 parts by weight to 4,900 parts by weight. When the amount of the specific polymer used (the content of the specific polymer) is 100 parts by weight or more with respect to 100 parts by weight of the compound having the infrared absorbing ability, the dispersion of the compound having the infrared absorbing ability is stabilized and when the amount of the specific polymer used (the content of the specific polymer) is 9,900 parts by weight or less with respect to 100 parts by weight of the compound having an infrared absorbing ability, the infrared absorbing efficiency of the infrared absorbing particle dispersion is good.

In the phase inversion emulsification method and the impregnation method, by also using an organic compound other than the compound represented by formula (1) together with the compound represented by formula (1) and the specific polymer, particles containing the organic compound other than the compound represented by formula (1), the compound represented by formula (1) and the specific polymer may be formed. Examples of the organic compound to be formed into particles therewith include a dye, a compound having an infrared absorbing ability other than the compound represented by formula (1) (for example, a squarylium dye, a croconium dye, a naphthalocyanine dye, a cyanine dye, an aminium type dye, and the like), compounds having an ultraviolet ray absorbing ability (for example, benzotriazole compounds, benzophenone compounds, and the like), and the like.

[Properties Infrared Absorbing Particle Dispersion]

The volume average particle diameter of the infrared absorbing particles included in the infrared absorbing particle dispersion is preferably from 10 nm to 150 nm, more preferably from 10 nm to 120 nm, and even more preferably from 10 nm to 100 nm. The volume average particle diameter being 10 nm or more makes an excellent light fastness and the volume average particle diameter being 150 nm or less provides excellent ink jet type droplet ejection characteristics. The particle size distribution may be either a broad particle size distribution or a monodisperse particle size distribution. The average particle size and particle size distribution of the infrared absorbing particles are measured, for example, by a light scattering method.

From the viewpoint of preventing the decomposition of the compound represented by formula (1) and preventing reduction over time of the infrared absorbing performance, the pH of the infrared absorbing particle dispersion according to the exemplary embodiment is preferably 10.5 or less, more preferably 10.0 or less, even more preferably 9.5 or less, and yet more preferably 9.0 or less. On the other hand, from the viewpoint of stably dispersing the specific polymer and the infrared absorbing particles, the pH of the infrared absorbing particle dispersion according to the exemplary embodiment is preferably 6.0 or more, more preferably 6.5 or more, and even more preferably 7.0 or more.

In addition, since general aqueous inks are alkaline (pH is about 8 to 10), the pH of the infrared absorbing particle dispersion according to the exemplary embodiment is also preferably in the above range from the viewpoint of preparing an aqueous ink using the infrared absorbing particle dispersion according to the exemplary embodiment.

In the exemplary embodiment, the pH of the infrared absorbing particle dispersion is measured in an environment of a temperature of 23±0.5° C. and a relative humidity of 55±5%.

The surface tension of the infrared absorbing particle dispersion according to the exemplary embodiment is preferably from 20 mN/m to 10 mN/m, and more preferably from 25 mN/m to 35 mN/m. In the exemplary embodiment, the surface tension of the infrared absorbing particle dispersion is measured using a Wilhelmy type surface tension meter in an environment of a temperature of 23±0.5° C. and a relative humidity of 55±5%.

The viscosity of the infrared absorbing particle dispersion according to the exemplary embodiment is preferably from 1 mPa·s to 30 mPa·s, and more preferably from 2 mPa·s to 20 mPa·s. In the exemplary embodiment, the viscosity of the infrared absorbing particle dispersion is measured under the conditions of a temperature of 23±0.5° C. and a shear rate of 1,400 s$^{-1}$ using a TV-20 type viscometer (Toki Sangyo Co., Ltd.) as a measuring apparatus.

<Aqueous Ink>

The aqueous ink according to the exemplary embodiment is an aqueous ink including an aqueous medium, and infrared absorbing particles dispersed in the aqueous medium, in which the infrared absorbing particles contain a compound represented by formula (1) and at least one of polymers selected from the group consisting of polyurethane, polyester, polyamide, polyurea, and polycarbonate, each having an acid value of from 5 mg KOH/g to 50 mg KOH/g.

The details of the compound represented by formula (1), the specific polymer, and infrared absorbing particles in the aqueous ink according to the exemplary embodiment are as described for the infrared absorbing particle dispersion according to the exemplary embodiment.

For example, the aqueous ink according to the exemplary embodiment may be the infrared absorbing particle dispersion itself according to the exemplary embodiment; a composition in which at least a coloring agent is added to the infrared absorbing particle dispersion according to the exemplary embodiment; a composition in which the infrared absorbing particle dispersion according to the exemplary embodiment is added to a commercially available aqueous ink; and the like.

[Aqueous Medium]

The medium for the aqueous ink is water or a mixed solvent containing water as a main solvent. The mixed solvent is, for example, a mixture of water and a water-soluble organic solvent. Examples of water-soluble organic solvents include alcohols, polyols, polyol derivatives, nitrogen-containing solvents, sulfur-containing solvents, and the like. The details of the water and the water-soluble organic solvent in the aqueous ink are the same as those described for the infrared absorbing particle dispersion.

The content of water is preferably from 40% by weight to 80% by weight with respect to the total weight of the aqueous ink, and more preferably from 50% by weight to 80% by weight.

The content of the water-soluble organic solvent is preferably 50% by weight or less with respect to the total weight of the aqueous ink, and more preferably 40% by weight or less.

[Coloring Agent]

Examples of the coloring agent include pigments and dyes, and a pigment is preferable from the viewpoint of the light fastness of the image and the like.

In a case where a pigment is used as a coloring agent, it is preferable to use a pigment dispersing agent in combination therewith. Examples of the pigment dispersing agent include any well-known polymer dispersing agent, surfactant, and the like. One of the pigment dispersing agents may be used, or two or more thereof may be used in combination. The content of the pigment dispersing agent varies depending on the type of the pigment and the type of the pigment dispersing agent and therefore is not categorically set, but content is preferably from 0.1% by weight to 100% by weight with respect to the content of the pigment.

Examples of the pigment include a pigment self-dispersible in water (referred to below as "self-dispersible pigment") The self-dispersible pigment refers to a pigment having a hydrophilic group on the pigment surface and which disperses in water even without a pigment dispersing agent. Examples of the self-dispersible pigment include any known self-dispersible pigment obtained by subjecting a pigment to a surface modification treatment such as a coupling agent treatment, a polymer grafting treatment, a plasma treatment, an oxidation treatment, and a reduction treatment.

Examples of the pigment include a so-called microcapsule pigment coated with a resin. Commercially available microcapsule pigments are manufactured by DIC Corporation and Toyo Ink Mfg. Co., Ltd.

Examples of the pigment include a resin dispersed pigment obtained by physically adsorbing or chemically bonding a polymer compound to a pigment.

Examples of the pigments include specific color pigments such as red, green, brown, and white; metallic lustrous pigments such as gold and silver; colorless or light color extender pigments; plastic pigments; particles in which dyes or pigments are fixed on the surface of silica, alumina, polymer beads or the like; insoluble laked products of dyes; colored emulsions; colored latexes; and the like.

In a case where a dye is used as the coloring agent, it is preferable to make the dye into particles together with a polymer dispersing agent (for example, the specific polymer of the present disclosure) and to incorporate these particles into the aqueous ink.

In a case where the coloring agent is a granular substance, the volume average particle diameter thereof is, for example, from 10 nm to 200 nm.

The content of the coloring agent is preferably from 1% by weight to 25% by weight with respect to the total weight of the aqueous ink, and more preferably from 2% by weight to 20% by weight.

[Additives]

The aqueous ink according to the exemplary embodiment may include various additives as necessary. Examples of the additives include a polymer, a surfactant, a penetrant, a viscosity adjusting agent, a pH adjusting agent, a pH buffering agent, an antioxidant, an ultraviolet absorber, a preservative, a fungicide, and the like. The aqueous ink according to the exemplary embodiment may include a compound having an infrared absorbing ability other than the compound represented by formula (1).

[Properties of Aqueous Ink]

The volume average particle diameter of the infrared absorbing particles included in the aqueous ink is preferably from 10 nm to 150 nm, more preferably from 10 nm to 120 nm, and even more preferably from 10 nm to 100 nm. The volume average particle diameter being 10 nm or more provides an excellent light fastness and the volume average particle diameter being 150 nm or less provides excellent ink jet type droplet ejection characteristics. The particle size distribution may be either a broad particle size distribution or a monodisperse particle size distribution. The average particle size and particle size distribution of the infrared absorbing particles are measured, for example, by a light scattering method.

The pH of the aqueous ink according to the exemplary embodiment is preferably from 6.5 to 10.5, more preferably from 7.0 to 10.0, and even more preferably from 8.0 to 10.0. In the exemplary embodiment, the pH of the aqueous ink is measured in an environment, of a temperature of 23±0.5° C. and a relative humidity of 55±5%.

The surface tension of the aqueous ink according to the exemplary embodiment is preferably from 20 mN/m to 40 or less, and more preferably from 25 mN/m to 35 mN/m or less in the exemplary embodiment, the surface tension of the aqueous ink is measured using a WILHELMY type surface tension meter in an environment of a temperature of 23±0.5° C. and a relative humidity of 55±5%.

The viscosity of the aqueous ink according to the exemplary embodiment is preferably from 1 mPa·s to 30 mPa·s or less, and more preferably from 2 mPa·s to 20 mPa·s or less. In the exemplary embodiment, the viscosity of the aqueous ink is measured under the conditions of a temperature of 23±0.5° C. and a shear rate of 1,400 s$^{-1}$ using a TV-20 TYPE VISCOMETER (TOKI SANGYO CO., LTD.) as a measuring apparatus.

<Ink Cartridge>

The ink cartridge according to the exemplary embodiment is a cartridge accommodating the aqueous ink according to the exemplary embodiment. The ink cartridge according to the exemplary embodiment is, for example, provided in a form that is detachable from an ink jet type recording apparatus.

<Recording Apparatus and Recording Method>

The recording apparatus according to the exemplary embodiment includes an ink applying unit for accommodating the aqueous ink according to the exemplary embodiment and applying the aqueous ink to the recording medium, and an infrared irradiation unit for irradiating the aqueous ink applied to the recording medium with infrared rays. A recording method including an ink applying step of applying the aqueous ink according to the exemplary embodiment to a recording medium, and an infrared irradiation step of irradiating the aqueous ink applied to the recording medium with infrared rays is realized by the recording apparatus according to the exemplary embodiment.

Examples of the ink applying unit in the exemplary embodiment include: an electing unit for ejecting ink by an ink jet system; a coating unit using a roller, a spray, a sponge or the like; a printing unit using offset printing, screen printing, gravure printing, relief printing, or the like.

The ink applying unit in the exemplary embodiment is preferably an ejecting unit for ejecting ink using an ink jet system. A recording apparatus and a recording method applying the ink jet system are excellent in ejection stability due to using the aqueous ink according to the exemplary embodiment.

The recording apparatus according to the exemplary embodiment is provided with an infrared irradiation unit as a drying unit for drying the aqueous ink applied to the recording medium. In addition to the infrared ray irradiation unit, the recording apparatus according to the exemplary embodiment may be provided with a contact type heating unit such as a heating roller, a heating drum, a heating belt, or the like; a hot air unit formed of a heating element and a blower; or a combination thereof as a drying unit.

Examples of the recording medium include paper, paper coated with resin, and films and plates made of resin, metal, glass, ceramics, silicon, rubber, or the like.

The recording apparatus according to the present embodiment may be provided with an ink cartridge accommodating the aqueous ink according to the exemplary embodiment and formed into a cartridge so as to be detached from the recording apparatus.

Description will be given below of an example of the recording apparatus and the recording method according to the exemplary embodiment with reference to the drawings, The FIGURE is a schematic configuration diagram which shows an example of a recording apparatus according to the exemplary embodiment. A recording apparatus 12 shown in the FIGURE is an ink jet type recording apparatus.

The recording apparatus 12 shown in the FIGURE is provided with, in a housing 14, a container 16 which accommodates the recording medium P before image recording, an endless transport belt 28 stretched around the driving roller 24 and the driven roller 26, ink ejection heads (ink ejection heads 30Y, 30M, 30C, and 30K, collectively referred to as an ink ejection head 30) as an example of an ink applying unit, an infrared irradiation apparatus (infrared irradiation apparatuses 60Y, 60M, 60C, and 60K, collectively referred to as an infrared irradiation apparatus 60), and a container 40 for accommodating the recording medium P after image recording.

Between the container 16 and the transport belt 28 is a transport path 22 through which the recording medium P before image recording is transported, and a roller 18 for picking up the recording medium P one by one from the container 16, and plural roller pairs 20 for transporting the recording medium P are arranged on the transport path 22. A charging roller 32 is arranged on the upstream side of the transport belt 28. The charging roller 32 is driven while nipping the transport belt 28 and the recording medium P between itself and the driven roller 26 to generate an electric potential difference between the charging roller 32 and the grounded driven roller 26, and apply an electric charge to the recording medium P to electrostatically attract the recording medium P to the transport belt 28.

The ink ejection head 30 is arranged above the transport belt 28 so as to face the flat portion of the transport belt 28. A region where the ink ejection head 30 and the transport belt 28 face each other is a region where ink droplets are ejected from the ink ejection head 30.

Each of the ink ejection heads 30Y, 30M, 30C, and 30K is respectively a head for recording a Y (yellow) image, a head for recording an M (magenta) image, a head for recording a C (cyan) image, and a head for recording a K (black) image. The ink ejection heads 30Y, 30M, 30C, and 30K are, for example, lined up in this order from the upstream side to the downstream side of the transport belt 28. The ink ejection heads 30Y, 30M, 30C, and 30K are respectively connected through supply pipes (not shown) to ink cartridges 31Y, 31M, 31C, and 31K of each color to be detachable from the recording apparatus 12, and inks of each colors are supplied from the ink cartridges to the ejection head.

Examples of the ink ejection head 30 include a long head in which the effective recording region (the region where the nozzles ejecting the ink are arranged) is set to be the width or more of the recording medium P (the length of the recording medium P in the direction orthogonal to the transport direction), or a carriage-type head which is shorter than the width of the recording medium P and which moves in the width direction of the recording medium to eject ink.

Examples of the ink jet system adopted by the ink ejection head 30 include a piezo system utilizing the vibration pressure of a piezo element; a charge control system which ejects ink by utilizing electrostatic attraction; an acoustic ink jet system in which an electric signal is converted into an acoustic beam to irradiate the ink and the ink is ejected using radiation pressure; a thermal ink jet system in which bubbles are formed by heating the ink in order to utilize the generated pressure.

For example, the ink ejection head 30 is a low-resolution recording head (for example, 600 dpi recording head) which ejects ink droplets in a range of an ink droplet amount of from 10 pL to 15 pL or a high-resolution recording head (for example, a recording head of 1,200 dpi) which ejects ink droplets of 10 pL or less. dpi means "dots per inch".

The recording apparatus 12 is not limited to a configuration provided with four ink ejection heads. The recording apparatus 12 may take a form provided with four or more ink ejection heads in which intermediate colors are added to Y, M, C, and K or a form provided with one ink ejection head and recording an image of only one color.

On the downstream side of the ink ejection head 30, infrared irradiation apparatuses 60Y, 60M, 60C, and 60K are arranged above the transport belt 28 for each color ink ejection head. The infrared irradiation apparatus 60 (an example of an infrared irradiation unit) irradiates the ink on the recording medium. P with infrared rays to dry the ink.

Examples of the light source of the infrared irradiation apparatus 60 include light emitting diodes, semiconductor lasers, surface emitting semiconductor lasers, halogen lamps, and xenon lamps.

Examples of the infrared irradiation apparatus 60 include a long infrared irradiation apparatus in which an effective infrared irradiation region (the region where the light source which irradiates infrared rays is arranged) is set to be equal to or wider than the width of the region recorded by the ink ejection head 30, and a carriage-type infrared irradiation apparatus which is an infrared irradiation apparatus shorter than the width of the region recorded by the ink ejection head 30 and which moves in the width direction of the recording medium P to irradiate the recording medium P with infrared rays.

The irradiation conditions of the infrared irradiation apparatus 60 are set in accordance with the infrared absorbing performance of the ink, the water content in the ink, and the like. As the irradiation conditions, irradiation conditions for drying the amount of water in the ink applied on the recording medium P to be 10% by weight or less is preferable. Specific examples include a central wavelength of from 700 nm to 1,200 nm (preferably from 780 nm to 980 nm), an irradiation intensity of 0.1 J/cm$^2$ to 10 J/cm$^2$ (preferably from 1 J/cm$^2$ to 3 J/cm$^2$), and an irradiation time of from 0.1 milliseconds to seconds (preferably from 10 milliseconds to 100 milliseconds).

The recording apparatus 12 is not limited to a form in which the infrared irradiation apparatus is provided for the ink ejection heads of each color, but may be a form provided with only one infrared irradiation apparatus on the downstream side of the ink ejection head furthest downstream.

The recording apparatus 12 may include at least one of the contact type heating unit and the warm air blowing unit as the ink drying unit together with the infrared irradiation apparatus 60. For example, the contact type heating unit or the warm air blowing unit performs drying under the condition of increasing the surface temperature of the recording medium to a range of from 50° C. to 120° C.

On the downstream side of the infrared irradiation apparatus 60, a peeling plate 34 is arranged so as to face the driving roller 24. The peeling plate 34 separates the recording medium P from the transport belt 28.

Between the transport belt 28 and the container 40 is a transport path 36 on which the recording medium P is transported after image recording, and plural roller pairs 38 for transporting the recording medium P are arranged on the transport path 36.

Description will be given of the operation of the recording apparatus 12.

The recording medium P before image recording is taken out one by one by the roller 18 from the container 16 and is transported to the transport belt 28 by the plural roller pairs 20.

Next, the recording medium P is electrostatically attracted to the transport belt 28 by the charging roller 32, and is transported to the lower side of the ink ejection head 30 by the rotation of the transport belt 28.

Next, ink is ejected from the ink ejection head 30 onto the recording medium P, and an image is recorded. Subsequently, the ink on the recording medium P is irradiated with infrared rays from the infrared irradiation apparatus 60, heat is generated by the infrared absorption of the ink, the ink temperature rises, and the ink dries.

Next, the recording medium P on which the ink is dried and the image is fixed is separated from the transport belt 28 by the peeling plate 34, and is transported to the container 40 by plural roller pairs 38.

The recording apparatus according to the exemplary embodiment is not limited to a form to which ink is directly applied from the ink applying unit to the recording medium, but may also be applied to a form in which ink on the intermediate transfer member is transferred to the recording medium after the ink is applied to the intermediate transfer member from the ink applying unit.

The recording apparatus according to the exemplary embodiment is not limited to a sheet-fed machine as an example of the recording apparatus 12 shown in the FIGURE, but may be a rotary press machine.

EXAMPLES

Detailed description will be given below of embodiments of the invention using Examples, but the embodiments of the invention are not limited to these Examples. In the description below, unless otherwise noted, all "parts" are on a weight basis.

<Synthesis of Compound Represented by Formula (1)>
[Synthesis of Compound (I-a-1)]

Compound (I-a-1) is synthesized according to the reaction scheme below.

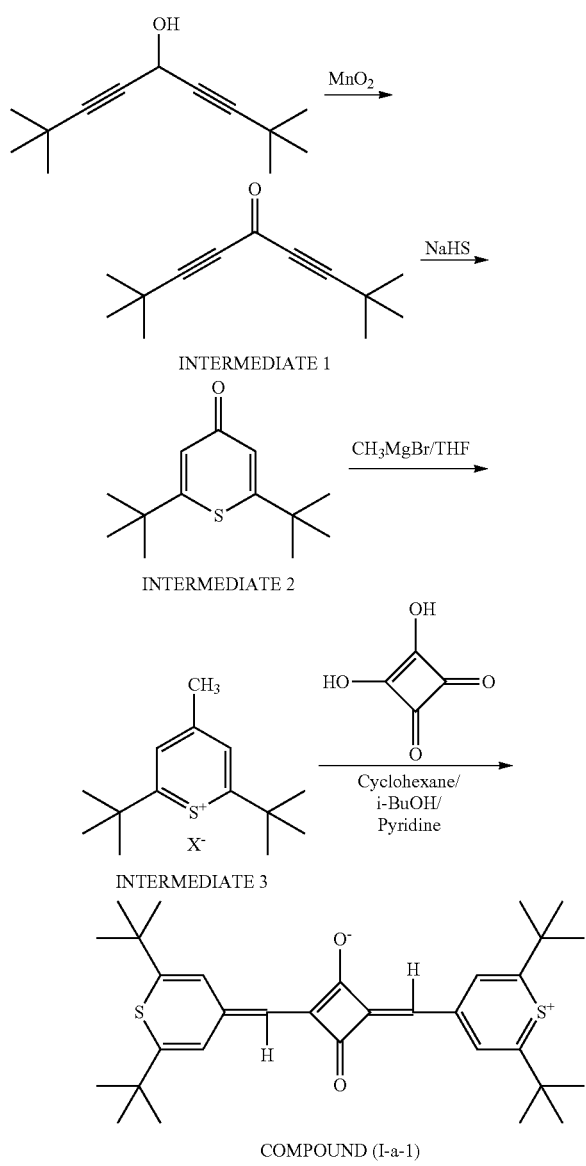

A three-necked flask is provided with a Dean-Stark trap, a reflux condenser tube, a stirring seal, and a stirring bar to prepare a reaction container. 2,2,8,8-tetramethyl-3,6-nonadiyne-5-ol and cyclohexane are placed in a reaction container. Manganese oxide (IV) powder is added thereto, stirred with a three one motor, and heated to reflux. The water formed during the reaction is removed by azeotropic distillation. It is confirmed by thin layer chromatography that there is no remaining 2,2,8,8-tetramethyl-3,6-nonadiyne-5-ol. The reaction mixture is allowed to be cooled and then filtered under reduced pressure to obtain a yellow filtrate (F1). The filtered solid is transferred to another container, ethyl acetate is added thereto, an operation of ultrasonic dispersion and filtering is repeated four times to obtain an ethyl acetate extract solution (F2). The ethyl acetate extract solution (F2) and the filtrate (E1) are mixed and concentrated by a rotary evaporator and a vacuum pump to obtain an orange liquid. The orange liquid is distilled under reduced pressure to obtain a pale yellow liquid (intermediate 1).

A thermometer and a dropping funnel are installed into a three-necked flask to prepare a reaction container. Sodium monosulfide n hydrate is added to ethanol, the mixture is stirred at room temperature (20° C.) until dissolved, and then cooled with ice water. When the internal temperature reached 5° C., the mixed solution of the intermediate 1 and ethanol is added dropwise little by little. The liquid changed from yellow to orange due to the dropwise addition. Since the internal temperature is increased due to heat generation, the dropwise addition is carried out in the range of the internal temperature of 5° C. to 7° C. while adjusting the dropping amount. Thereafter, the ice water bath is removed and the stirring is carried out while naturally allowing the temperature to be increased to room temperature (20° C.). Water is added to the reaction solution, and ethanol is removed by a rotary evaporator. After that, salt is added until saturation, and the organic phase is collected by separation with ethyl acetate. The organic phase is washed twice with saturated ammonium chloride and dried over magnesium sulfate. After drying, the resultant is concentrated under reduced pressure to collect a brown liquid. The brown liquid is distilled under reduced pressure. Although the fraction begins to be discharged from 200° C., since the purity of the target component is low initially, the main distillate s obtained as the amount of steam increased. Thus, a yellow liquid (intermediate 2) is distilled.

A stirring bar and the intermediate 2 are added into a three-necked flask, a nitrogen inlet tube and a reflux condenser are attached thereto, and nitrogen replacement is carried out. Under a nitrogen atmosphere, anhydrous tetrahydrofuran is added via a syringe, and a 1 M tetrahydrofuran solution of methyl magnesium bromide is added dropwise thereto with a syringe while stirring at room temperature (20° C.). After completion of the dropwise addition, the reaction solution is heated, stirred and refluxed. The reaction solution is allowed to cool in a nitrogen atmosphere, and then a solution of ammonium bromide dissolved in water is added dropwise thereto while cooling with an ice water bath. The reaction mixture is further stirred at room temperature (20° C.), then n-hexane is added and the mixture is dried over sodium sulfate. After drying, the n-hexane/tetrahydrofuran solution is taken out with a syringe and the inorganic layer is washed with ethyl acetate to obtain an extract. The n-hexane/tetrahydrofuran solution and the extract from the inorganic layer are mixed, concentrated under reduced pressure and vacuum-dried to obtain an intermediate 3.

In a nitrogen atmosphere, the intermediate 3 and squaric acid are dispersed in a mixed solvent of cyclohexane and isobutanol, pyridine is added thereto, and the mixture is heated under reflux. Thereafter, isobutanol is added thereto and the reaction mixture is further heated to reflux. Water generated during the reaction is removed by azeotropic distillation. The reaction mixture is allowed to cool and filtered under reduced pressure to remove insoluble matter. The filtrate is concentrated by a rotary evaporator. Methanol is added to the residue, heated to 40° C., and then cooled to −10° C. Crystals are obtained by filtration and dried under vacuum to obtain compound (I-a-1).

[Synthesis of Compound (I-a-2)]

A compound (I-a-2) is synthesized with the same process except that, the synthesis of compound (I-a-1), 2,2,10,10-tetramethyl-4,7-undecadiyne-6-ol is used instead of 2,2,8,8-tetramethyl-3,6-nonadiyne-5-ol.

[Synthesis of Compound (I-a-5)]

Compound (I-a-5) is synthesized with the same process except that, in the synthesis of compound (I-a-1), 2,10-dimethyl-4,7-undecaddyne-6-ol is used instead of 2,2,8,8-tetramethyl-3,6-nonadiyne-5-ol.

<Synthesis of Polymer>
[Synthesis of Polymer P-5]

39.1 parts of 4,4'-diphenylmethane diisocyanate, 6.6 parts of hexamethylene diisocyanate, 15.2 parts of tetraethylene glycol, 4.9 parts of ethylene glycol, 5.3 parts of 2,2-bis (hydroxymethyl) propionic acid, and 140 parts of N,N-dimethylacetamide are added into a three-necked flask provided with a stirrer and a reflux condenser tube and dissolved at room temperature while stirring. 0.2 parts of di-n-butyl tin dilaurate is added thereto, the temperature of the mixed solution is raised to 90° C., and the mixture is stirred for 7 hours while maintaining the temperature at 90° C. Next, after diluting the resultant with 50 parts of N,N-dimethylacetamide and cooling to room temperature, a solution of 2.2 parts of sodium methoxide dissolved in 80 parts of methanol is added thereto. The obtained polymer solution is poured into a mixed solution of ethyl acetate and hexane (volume ratio 80:20) to precipitate a polymer, which is then filtered and dried to obtain 69.5 parts of polymer P-5. Polymer P-5 has a weight average molecular weight (Mw) of 29,000 and an acid value of 32 mg KOH/g.

[Synthesis of Polymer P-5-1]

The polymer P-5-1 is obtained in the same manner as is the synthesis of the polymer P-5, except that, in the raw monomers, tetraethylene glycol is changed to 15.4 parts, ethylene glycol to 7.4 parts, and 2,2-bis (hydroxymethyl) propionic acid to 0.5 parts.

[Synthesis of Polymer P-5-2]

The polymer P-5-2 is obtained in the same manner as in the synthesis of the polymer P-5, except that, in the raw monomers, tetraethylene glycol is changed to 15.4 parts, ethylene glycol to 7.3 parts, and 2,2-bis (hydroxymethyl) propionic acid to 0.9 parts.

[Synthesis of Polymer P-5-3]

The polymer P-5-3 is obtained in the same manner as in the synthesis of the polymer P-5, except that, in the raw monomers, tetraethylene glycol is changed to 10 parts, ethylene glycol to 6 parts, and 2,2-bis (hydroxyl) propionic acid to 8 parts.

[Synthesis of Polymer P-5-4]

The polymer P-5-4 is obtained in the same manner as in the synthesis of the polymer P-5, except that, in the raw monomers, tetraethylene glycol is changed to 9 parts, ethylene glycol to 5 parts, and 2,2-his (hydroxymethyl) propionic acid to 10 parts.

[Synthesis of Polymer P-17]

46.5 parts of dimethyl terephthalate, 46.5 parts of dimethyl isophthalate, 6 parts of dimethyl sodium 5-sulfoisophthalate, 30 parts of ethylene glycol, 26 parts of neopentyl glycol, 0.05 parts of calcium acetate as a condensation catalyst, and 0.05 parts of antimony (III) oxide are added into a three-necked flask provided with a stirrer and a distillation tube, and the temperature is raised while the formed methanol and ethylene glycol are distilled off under a nitrogen stream, stirring is carried out for 30 minutes at 150° C., and further stirred for 1 hour at 190° C. Next, the temperature is lowered to approximately 150° C., the inside of the reaction system is slowly depressurized by a pump while stirring, temperature is raised while distilling off ethylene glycol and while keeping the pressure in the reaction system within the range of 10 Pa to 40 Pa, and the reaction is further carried out at 250° C. for 3 hours. The product is taken out as it is and cooled to obtain 120 parts of polymer P-17. Polymer P-17 has a weight average molecular weight (Mw) of 16,000 and an acid value of 11 mg KOH/g.

[Synthesis of Polymer P-17-1]

The polymer P-17-1 is obtained in the same manner as in the synthesis of the polymer P-17, except that, in the raw monomers, dimethyl terephthalate is changed to 49 parts and dimethyl sodium 5-sulfoisophthalate to 2 parts.

[Synthesis of Polymer P-17-2]

The polymer P-17-2 is obtained in the same manner as in the synthesis of the polymer P-17, except that, in the raw monomers, dimethyl terephthalate is changed to 48.5 parts and dimethyl sodium 5-sulfoisophthalate to 3 parts.

[Synthesis of Polymer P-17-3]

The polymer P-17-3 is obtained in the same manner as in the synthesis of the polymer P-17, except that, in the raw monomers, dimethyl terephthalate is changed to 48.5 parts, dimethyl isophthalate is changed to 29 parts, and dimethyl sodium 5-sulfoisophthalate to 30 parts.

[Synthesis of Polymer P-17-4]

The polymer P-17-4 is obtained in the same manner as in the synthesis of the polymer P-17, except that, in the raw monomers, dimethyl terephthalate is changed to 44.5 parts, dimethyl isophthalate is changed to 28 parts, and dimethyl sodium 5-sulfoisophthalate to 37 parts.

[Synthesis of Polymer P-39]

480 parts of poly (oxytetramethylene) glycol (n=27.5) having a number average molecular weight of 2,000, 282 parts of isophorone diisocyanate, 0.007 parts of dibutyl tin dilaurate are added to a reaction container and reacted at 100° C. for 1 hour under a nitrogen atmosphere. Next, the resultant is cooled to 65° C. or less, 42 parts of 2,2-bis (hydroxymethyl) propionic acid, 74.6 parts of neopentyl glycol, and 448 parts of methyl ethyl ketone are added and reacted at 80° C. for 16 hours, then 408 parts of methyl ethyl ketone and methanol are added to terminate the reaction, and a polymer P-39 solution (solid content concentration: 50% by weight) in which polymer P-39 is dissolved in methyl ethyl ketone is obtained. Polymer P-39 has a weight average molecular weight (Mw) of 68,000 and an acid value of 20 mg KOH/g.

Example 1: Production of Infrared-Absorbing Particle Dispersion

[Production of Infrared-Absorbing Particle Dispersion AD-1]

20 parts of the squarylium compound as compound (I-a-1) are placed in a flask. 3,600 parts of tetrahydrofuran are added thereto, and a stirring bar is added and stirred. Next, 380 parts of polymer P-5 are added, then 800 parts of methyl ethyl ketone and 80 parts of isopropyl alcohol are added and stirred and mixed. Next, a 10% by weight aqueous solution of sodium hydroxide is added in an amount of 0.9 equivalent of total carboxy groups included in the polymer P-5 while stirring. Next, while continuing stirring, 10,000 parts of water are slowly added and mixed therewith. After the mixed solution is in a nearly homogeneous state, a distillation tube and a decompression pump are attached to the flask, the mixed solution is heated so as to be from 30° C. to 35° C., the pressure is reduced while stirring, and a part of the organic solvent and water are distilled off. The operation of concentrating while replacing the organic solvent with water as repeated until the organic solvent odor disappeared while adjusting the amount of water added such that the sol id content concentration converted from the used raw materials do not exceed 7% by weight. The concentrated solution is filtered through a 230-mesh nylon mesh to obtain an infrared absorbing particle dispersion. With respect to this infrared absorbing particle dispersion, the solid content is measured and the yield is determined by the method described in "(1) Yield" to be described below. Water is added to this infrared absorbing particle dispersion based on the measured solid content to adjust the sol id content concentration to be 5% by weight so as to obtain an infrared absorbing particle dispersion AD-1. When converted from the amount of the compound (I-a-1) and the amount of the polymer used in the production of the infrared absorbing particle dispersion, the concentration of the compound (I-a-1) in the infrared absorbing particle dispersion AD-1 is 0.25% by weight.

[Production of Infrared-Absorbing Particle Dispersions AD-2 to 10]

Each infrared absorbing particle dispersion is obtained in the same manner as the production of the infrared absorbing particle dispersion AD-1 except that the type of the polymer and degree of neutralization (the amount (equivalent amount) of sodium hydroxide added to the total acid groups included in the polymer) and the compound having an absorption ability are changed according to Table 1. "I-a-2" in Table 1 is the compound (I-a-2), "I-a-5" is the compound (I-a-5), and "II" is compound (II) represented by the formula below.

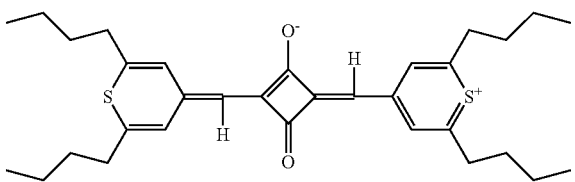

COMPOUND (II)

[Production of Infrared-Absorbing Particle Dispersion AD-11]

20 parts of the squarylium compound as the compound (I-a-1) are placed in a flask. 3,600 parts of tetrahydrofuran are added thereto, and a stirring bar is added and stirring is carried out. Next, 380 parts of polymer P-17 are added, and 2,700 parts of tetrahydrofuran are further added, stirred, and mixed in. Next, while continuing stirring, 110,000 parts of water are slowly added and mixed therewith. After the mixed solution is in a nearly homogeneous state, a distillation tube and a decompression pump are attached to the flask, the mixed solution is heated so as to be from 30° C. to 35° C., the pressure is reduced while stirring, and the organic solvent and a part of ater are distilled off. The operation of concentrating while replacing the organic solvent with water is repeated until the organic solvent odor disappeared while adjusting the amount of water added such that the solid content concentration converted from the used raw material do not exceed 7% by weight. The concentrated solution is filtered through a 230-mesh nylon mesh to obtain an infrared absorbing particle dispersion. With respect to this infrared absorbing particle dispersion, the solid content is measured and the yield is determined by the method described in "(1) Yield" to be described below. Water is added to the infrared absorbing particle dispersion based on the measured solid content to adjust the solid content concentration to be 5% by weight and to obtain an infrared absorbing particle dispersion AD-11. When converted from the amount of the compound (I-a-1) and the amount of the polymer used in the production of the infrared absorbing particle dispersion, the concentration of the compound (I-a-1) in the infrared absorbing particle dispersion AD-11 is 0.25% by weight.

[Production of Infrared Absorbing Particle Dispersions AD-12 to 18]

Each infrared absorbing particle dispersion is obtained in the same manner as the production of infrared absorbing particle dispersion AD-11 except that the type of polymer and the compound having infrared absorbing ability are changed according to Table 1.

[Production of Infrared-Absorbing Particle Dispersion AD-19]

An infrared absorbing particle dispersion AD-19 is obtained in the same manner as the production of infrared absorbing particle dispersion AD-1 except that 760 parts of Polymer P-39 solution are used instead of 380 parts of polymer P-5.

[Production of Infrared Absorbing Particle Dispersions AD-20 to 24]

Each infrared absorbing particle dispersion is obtained in the same manner as the product on of the infrared absorbing particle dispersion AD-19 except that the degree of neutralization of the polymer (the amount (equivalent amount) of sodium hydroxide added to the total acid groups included in the polymer) and compound having the infrared absorbing ability are changed according to Table 1.

[Evaluation]
(1) Yield

A portion of the infrared absorbing particle dispersion is dried by heating at 120° C. under atmospheric pressure for 2 hours, the solid content (weight) is measured, and the yield is determined according to the formula below and classified as follows.

Solid content of infrared absorbing particle dispersion/(amount of compound having infrared absorbing ability used for preparing infrared absorbing particle dispersion+solid content of polymer solution used for preparing infrared absorbing particle dispersion+weight of sodium hydroxide used for neutralization in the process of preparing the infrared absorbing particle dispersion)×100     Formula:

G1: Yield of 90% or more.
G2: Yield of 80% or more and less than 90%.
G3: Yield of 70% or more and less than 80%.
G4: Yield less than 70%.

(2) Particle Size

Using a dynamic light scattering type particle size distribution measurement apparatus LB-500 (HORIBA, LTD.), the volume median diameter (nm) of particles dispersed in an infrared absorbing particle dispersion (solid content concentration: 5% by weight) is measured.

(3) Reduction Rate of Infrared Absorption Amount

An infrared absorbing particle dispersion (solid content concentration 5% by weight) is diluted 5-fold and stored at a temperature of 60° C. for 15 days. For each of the infrared absorbing particle dispersions before and after storage, the amount of absorption at a wavelength of 818 nm is measured using a spectrophotometer (manufactured by Hitachi Ltd., U-4100), and the reduction rate in the infrared absorption amount is calculated according to the formula below and classified as follows.

Reduction rate of infrared absorption amount (%)= ((Infrared absorption amount before storage−infrared absorption amount after storage)/infrared absorption amount before storage)×100     Formula:

G1: Reduction rate is less than 15%.
G2: Reduction rate 15% or more and less than 35%.
G3: Reduction rate 35% or more and less than 50%.
G4: Reduction rate is 50% or more.

TABLE 1

| | \multicolumn{12}{c|}{Infrared absorbing particle dispersion} |
|---|---|---|---|---|---|---|---|---|---|---|---|---|
| | AD-1 | AD-2 | AD-3 | AD-4 | AD-5 | AD-6 | AD-7 | AD-8 | AD-9 | AD-10 | AD-11 | AD-12 |
| Polymer | P-5 | P-5 | P-5 | P-5-2 | P-5-3 | P-5-4 | P-5 | P-5 | P-5 | P-5 | P-17 | P-17-1 |
| Mw of polymer | 29000 | 29000 | 34000 | 30000 | 26000 | 28000 | 29000 | 29000 | 29000 | 29000 | 16000 | 17000 |
| Acid value of polymer (mgKOH/g) | 32 | 32 | 3 | 5 | 48 | 60 | 32 | 32 | 32 | 32 | 11 | 3 |
| Compound having infrared absorbing ability | I-a-1 | I-a-1 | I-a-1 | I-a-1 | I-a-1 | I-a-1 | I-a-2 | I-a-2 | I-a-5 | II | I-a-1 | I-a-1 |
| Neutralization degree | 0.9 | 0.8 | 0.8 | 0.8 | 0.8 | 0.8 | 0.8 | 1.1 | 0.8 | 0.9 | 1.0 | 1.0 |
| Dispersion pH | 9.9 | 8.8 | 8.8 | 8.8 | 8.8 | 8.8 | 8.8 | 11.0 | 8.8 | 9.8 | 7.0 | 7.0 |
| Yield | G1 | G1 | G4 | G2 | G1 | G3 | G1 | G1 | G1 | G1 | G1 | G4 |
| Particle size (nm) | 80 | 85 | 142 | 110 | 83 | 90 | 105 | 102 | 93 | 97 | 110 | 140 |
| Reduction rate of infrared absorbing amount | G2 | G1 | G1 | G1 | G1 | G1 | G2 | G4 | G3 | G4 | G1 | G1 |
| Notes | Example | Example | Comparative Example | Example | Example | Comparative Example | Example | Example | Example | Comparative Example | Example | Comparative Example |

| | \multicolumn{12}{c|}{Infrared absorbing particle dispersion} |
|---|---|---|---|---|---|---|---|---|---|---|---|---|
| | AD-13 | AD-14 | AD-15 | AD-16 | AD-17 | AD-18 | AD-19 | AD-20 | AD-21 | AD-22 | AD-23 | AD-24 |
| Polymer | P-17-2 | P-17-3 | P-17-4 | P-17 | P-17 | P-17 | P-39 | P-39 | P-39 | P-39 | P-39 | P-39 |
| Mw of polymer | 18000 | 19000 | 18000 | 16000 | 16000 | 16000 | 68000 | 68000 | 68000 | 68000 | 68000 | 68000 |
| Acid value of polymer (mgKOH/g) | 5 | 49 | 59 | 11 | 11 | 11 | 20 | 20 | 20 | 20 | 20 | 20 |
| Compound having infrared absorbing ability | I-a-1 | I-a-1 | I-a-1 | I-a-2 | I-a-5 | II | I-a-1 | I-a-1 | I-a-1 | I-a-2 | I-a-5 | II |
| Neutralization degree | 1.0 | 1.0 | 1.0 | 1.0 | 1.0 | 1.0 | 0.9 | 1.0 | 0.8 | 0.9 | 0.9 | 0.9 |
| Dispersion pH | 7.0 | 7.0 | 7.0 | 7.0 | 7.0 | 7.0 | 9.9 | 10.2 | 9.7 | 9.7 | 9.7 | 9.7 |
| Yield | G2 | G1 | G3 | G1 | G1 | G1 | G1 | G1 | G1 | G1 | G1 | G1 |
| Particle size (nm) | 110 | 105 | 108 | 105 | 100 | 116 | 112 | 114 | 116 | 108 | 104 | 106 |
| Reduction rate of infrared absorbing amount | G1 | G1 | G1 | G1 | G2 | G4 | G2 | G3 | G2 | G2 | G3 | G4 |
| Notes | Example | Example | Comparative Example | Example | Example | Comparative Example | Example | Example | Example | Example | Example | Comparative Example |

Example 2: Production of Infrared Absorbing Ink (Light-Fixing Ink)

[Preparation of Cyan Pigment Dispersion CD 1]

A mixed solution formed of 6 parts of styrene, 11 parts of stearyl methacrylate, 4 parts of styrene macromer AS-6 (TOAGOSEI CO., LTD.), 5 parts of Blemmer PP-500 (NOF Corp.) 5 parts of methacrylic acid, 0.05 parts of 2-mercaptoethanol, and 24 parts of methyl ethyl ketone are prepared in a reaction container. Separately, a mixed solution formed of 14 parts of styrene, 24 parts of stearyl methacrylate, 9 parts of styrene macromer AS-6 (TOAGOSEI CO., LTD.), 9 parts of Blemmer PP-500 (NOF Corp.), 10 parts of methacrylic acid, 0.13 parts of 2-mercaptoethanol, 56 parts of methyl ethyl ketone, and 1.2 parts of 2,2'-azobis (2,4-dimethylvaleronitrile) are prepared and placed in a dropping funnel.

Under a nitrogen atmosphere, the mixed solution in the reaction container is heated to 75° C. while stirring, and the mixed solution in the dropping funnel is added dropwise thereto over 1 hour. After 2 hours from the completion of the dropwise addition, a solution in which 1.2 parts of 2,2-azobis (2,4-dimethylvaleronitrile) are dissolved in 12 parts of methyl ethyl ketone is added dropwise over 3 hours, followed by reaction at 75° C. for 2 hours and further aging at 80° C. for 2 hours to obtain a polymer solution.

5 parts (in terms of solid content) of the obtained polymer solution, 10 parts of Pigment Blue 15:3 (DAINICHISEIKA COLOR & CHEMICALS MFG. CO., LTD.), 40 parts of methyl ethyl ketone, 8 parts of 1 mol/L sodium hydroxide aqueous solution, and 82 parts of ion-replaced water are put into a bead mill disperser together with 300 parts of 0.1 mm zirconia beads and dispersed for 6 hours. The obtained dispersion concentrated under reduced pressure using an evaporator to remove methyl ethyl ketone to concentrate the dispersion until the pigment concentration reaches 10% by weight. In this manner, a cyan pigment dispersion CD1 is obtained in which a cyan pigment where the surface is coated with the polymer dispersing agent is dispersed. The volume average particle diameter of the cyan pigment dispersion CD1 is 77 nm.

[Production of Cyan Ink C-1]

After mixing the materials below, coarse particles are removed with a 5 µm filter to obtain a cyan ink C-1. As the infrared absorbing particle dispersion AD-1, the dispersion immediately after production is used.

The pH of the cyan ink C-1 is 9.8.

Cyan Pigment Dispersion. CD1:
    6% by weight (in terms of solid content)
Infrared Absorbing Particle Dispersion AD-1:
    1% by weight (in terms of solid content)
Diethylene glycol: 5% by weight
Propanediol: 25% by weight
OLFINE E 1010 (Nisshin Chemical Industry Co., Ltd.):
    1.2% by weight
Ion exchanged water:
    Residual amount such that the total amount becomes 100% by weight

[Production of Cyan Inks C-2 to 17]

Cyan inks C-2 to 17 are obtained in the same manner as in the production of cyan ink C-1, except that the infrared absorbing particle dispersion AD-1 is changed to one of the infrared absorbing particle dispersions AD-2, 4, 5, 7 to 9, 11, 13, 14, 16, 17, and 19 to 23. For the infrared absorbing particle dispersions, the dispersion immediately after production is used.

[Printing Test]

Cyan Inks C-1 to C-17 immediately after production are refilled into cartridges of an ink jet printer PX-1004 manufactured by Epson Co., Ltd., and printed on Tokubishi Art Double Sided N (Mitsubishi Paper Mills Ltd.) with the ink jet printer PX-1004 and, in all the cyan inks C-1 to C-17, it is possible to perform satisfactory printing without ejection defects. The image is irradiated with infrared rays under the conditions of a center wavelength of 810 nm, an irradiation intensity of 3 J/cm$^2$, and an irradiation time of 200 ms and an image without bleeding is obtained with all of the cyan inks C-1 to C-17.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An infrared absorbing particle dispersion comprising:
    an aqueous medium; and
    infrared absorbing particles that are dispersed in the aqueous medium and contain a compound represented by formula (1) below and at least one polymer selected from the group consisting of polyurethane, polyester, polyamide, polyurea, and polycarbonate, each having an acid value of from 5 mg KOH/g to 50 mg KOH/g:

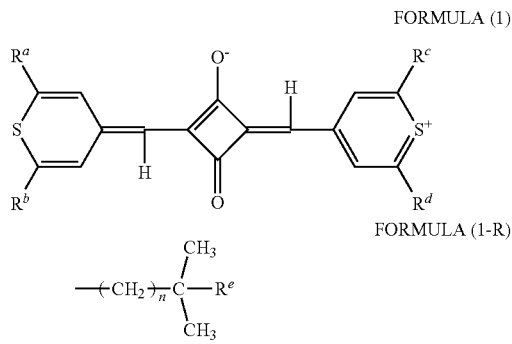

FORMULA (1)

FORMULA (1-R)

wherein, in formula (1), $R^a$ represents a group represented by formula (1-R) and $R^b$, $R^c$, and $R^d$ each independently represent an alkyl group, and, in formula (1-R), $R^e$ represents a hydrogen atom or a methyl group and n represents an integer of from 0 to 3.

2. The infrared absorbing particle dispersion according to claim 1,
    wherein the compound represented by formula (1) has a maximum absorption wavelength (λ max) of from 760 nm to 1,200 nm.

3. The infrared absorbing particle dispersion according to claim 1,
    wherein a molar extinction coefficient (λ max) at the maximum absorption wavelength (λ max) of the compound represented by formula (1) (in a tetrahydrofuran solution) is from $1 \times 10^5$ Lmol$^{-1}$cm$^{-1}$ to $6 \times 10^5$ Lmol$^{-1}$cm$^{-1}$.

4. The infrared absorbing particle dispersion according to claim 1,
    which has a pH of from 6.0 to 10.5.

5. The infrared absorbing particle dispersion according to claim 1,
    wherein the infrared absorbing particles have a volume average particle diameter of from 10 nm to 150 nm.

6. The infrared absorbing particle dispersion according to claim 1,
    wherein the polymer has a dissociable group.

7. The infrared absorbing particle dispersion according to claim 6,
    wherein the dissociable group is an anionic group.

8. The infrared absorbing particle dispersion according to claim 7,
    wherein the anionic group includes at least a carboxy group or a sulfonic acid group.

9. The infrared absorbing particle dispersion according to claim 1,
    wherein the polymer has a weight average molecular weight of from 1,000 to 200,000.

10. The infrared absorbing particle dispersion according to claim 1,
    wherein the polymer has a glass transition temperature of from 40° C. to 150° C.

11. The infrared absorbing particle dispersion according to claim 1,
    which has a surface tension of from 20 mN/m to 40 mN/m when measured at a temperature of 23±0.5° C. and a relative humidity of 55±5%.

12. The infrared absorbing particle dispersion according to claim 1,
   which has a viscosity of from 1 mPa·s to 30 mPa·s when measured at a temperature of 23±0.5° C. and a shear rate of 1,400 s$^{-1}$ using a TV-20 viscometer as a measuring apparatus.

13. An aqueous ink comprising:
   an aqueous medium; and
   infrared absorbing particles that are dispersed in the aqueous medium and contain a compound represented by formula (1) below and at least one of polymers selected from the group consisting of polyurethane, polyester, polyamide, polyurea, and polycarbonate, each having an acid value of from 5 mg KOH/g to 50 mg KOH/g:

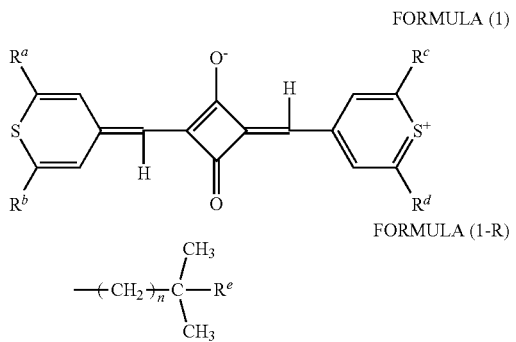

FORMULA (1)

FORMULA (1-R)

wherein, in formula (1), $R^a$ represents a group represented by formula (1-R) and $R^b$, $R^c$, and $R^d$ each independently represent an alkyl group, and, in formula (1-R), $R^e$ represents a hydrogen atom or a methyl group and n represents an integer of from 0 to 3.

14. The aqueous ink according to claim 13,
   wherein a content of the aqueous medium is from 40% by weight to 80% by weight with respect to a total weight of the aqueous ink.

15. The aqueous ink according to claim 13, further comprising:
   a coloring agent,
   wherein a volume average particle diameter of the coloring agent is from 10 nm to 200 nm.

16. The aqueous ink according to claim 13,
   wherein a content of the coloring agent is from 1% by weight to 25% by weight with respect to a total weight of the aqueous ink.

17. The aqueous ink according to claim 13,
   wherein a volume average particle diameter of the infrared absorbing particles is from 10 nm to 150 nm.

18. The aqueous ink according to claim 13,
   which has a surface tension is from 20 mN/m to 40 mN/m when measured at a temperature of 23±0.5° C. and a relative humidity of 55±5%.

19. The aqueous ink according to claim 13,
   which has a viscosity is from 1 mPa·s to 30 mPa·s when measured at a temperature of 23±0.5° C. and a shear rate of 1,400 s$^{-1}$ using a TV-20 viscometer as a measuring apparatus.

20. An ink cartridge accommodating the aqueous ink according to claim 13.

* * * * *